United States Patent
Hardy

(10) Patent No.: US 12,250,382 B2
(45) Date of Patent: Mar. 11, 2025

(54) METHODS AND SYSTEMS FOR AUTOMATED SYNCHRONIZATION AND OPTIMIZATION OF AUDIO-VISUAL FILES

(71) Applicant: Brian Hardy, Atlanta, GA (US)

(72) Inventor: Brian Hardy, Atlanta, GA (US)

(73) Assignee: Videomentum Inc.

( * ) Notice: Subject to any disclaimer, the term of this patent is extended or adjusted under 35 U.S.C. 154(b) by 0 days.

(21) Appl. No.: 18/497,150

(22) Filed: Oct. 30, 2023

(65) Prior Publication Data
US 2024/0214576 A1 Jun. 27, 2024

Related U.S. Application Data

(63) Continuation of application No. 17/722,803, filed on Apr. 18, 2022, now Pat. No. 11,805,260, which is a continuation of application No. 17/197,741, filed on Mar. 10, 2021, now Pat. No. 11,350,103.

(60) Provisional application No. 62/988,070, filed on Mar. 11, 2020.

(51) Int. Cl.
*H04N 19/139* (2014.01)
*H04N 19/119* (2014.01)
*H04N 19/14* (2014.01)

(52) U.S. Cl.
CPC ......... *H04N 19/139* (2014.11); *H04N 19/119* (2014.11); *H04N 19/14* (2014.11)

(58) Field of Classification Search
CPC ..... H04N 19/139; H04N 19/119; H04N 19/14
See application file for complete search history.

(56) References Cited

U.S. PATENT DOCUMENTS

| | | | | |
|---|---|---|---|---|
| 9,521,398 | B1* | 12/2016 | Woodman | H04N 13/239 |
| 2002/0122659 | A1* | 9/2002 | McGrath | H04N 5/772 |
| | | | | 386/E5.072 |
| 2005/0243925 | A1* | 11/2005 | Bottreau | H04N 19/615 |
| | | | | 375/E7.22 |
| 2006/0088191 | A1* | 4/2006 | Zhang | G06V 20/40 |
| | | | | 382/103 |
| 2007/0005795 | A1* | 1/2007 | Gonzalez | H04N 19/25 |
| | | | | 375/E7.006 |
| 2007/0016405 | A1* | 1/2007 | Mehrotra | G10L 19/025 |
| | | | | 704/203 |
| 2007/0200853 | A1* | 8/2007 | Bruggeman | G11B 27/034 |
| | | | | 345/473 |
| 2008/0231756 | A1* | 9/2008 | Kondo | H04N 5/2628 |
| | | | | 348/E5.062 |
| 2011/0096840 | A1* | 4/2011 | Sano | H04N 19/112 |
| | | | | 375/240.16 |
| 2015/0371426 | A1* | 12/2015 | Levy | G06T 13/80 |
| | | | | 345/473 |
| 2016/0218820 | A1* | 7/2016 | Scurrell | H04J 3/0661 |
| 2018/0374192 | A1* | 12/2018 | Kunkel | H04N 23/58 |

(Continued)

*Primary Examiner* — Zaihan Jiang
(74) *Attorney, Agent, or Firm* — John P. Lawrence

(57) ABSTRACT

One variation of a method for autonomously generating an optimized audio-visual (AV) file from an original AV file comprises: a) generating a vector cube comprising a plurality of vector matrices for an original AV file; b) for each vector matrix within the vector cube, determining an optimal subframe having a subframe size larger than or equal to a predetermined minimum subframe size; and c) generating an optimized AV file based on the optimal subframes determined for each of the vector matrices within the vector cube.

20 Claims, 25 Drawing Sheets

(56) References Cited

U.S. PATENT DOCUMENTS

| | | | |
|---|---|---|---|
| 2019/0035431 A1* | 1/2019 | Attorre | G10L 25/30 |
| 2020/0162643 A1* | 5/2020 | Park | G06T 3/08 |
| 2021/0104014 A1* | 4/2021 | Kolb, V | G06T 3/4053 |
| 2021/0239863 A1* | 8/2021 | Tavitian | G06T 11/008 |

* cited by examiner

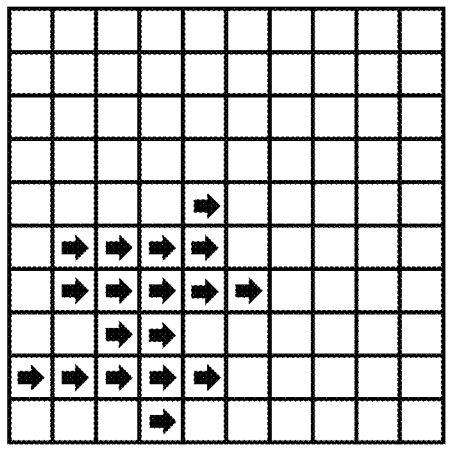
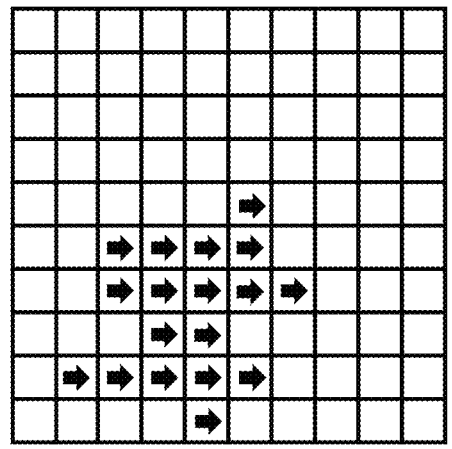
424A  424B
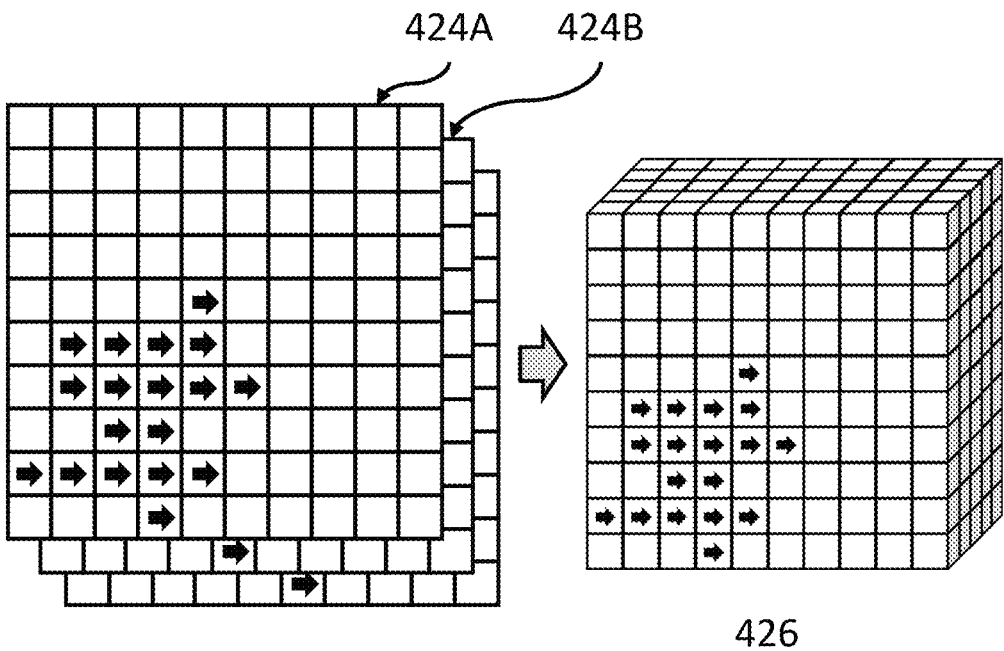
426
FIG. 4

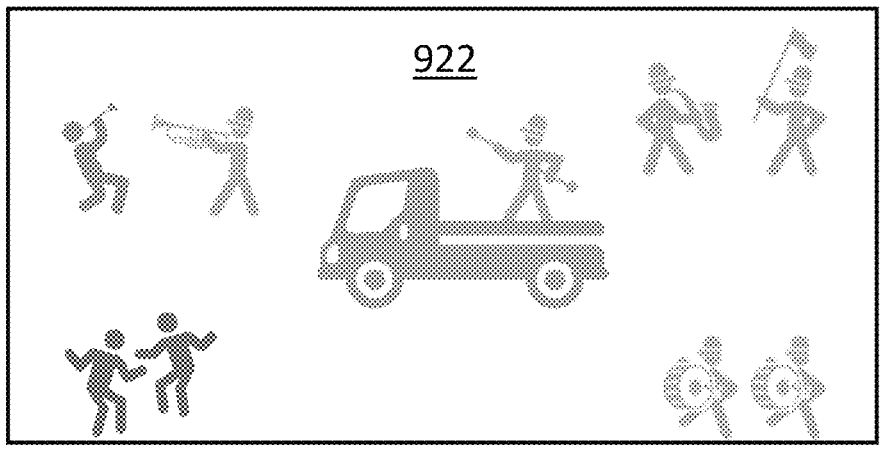
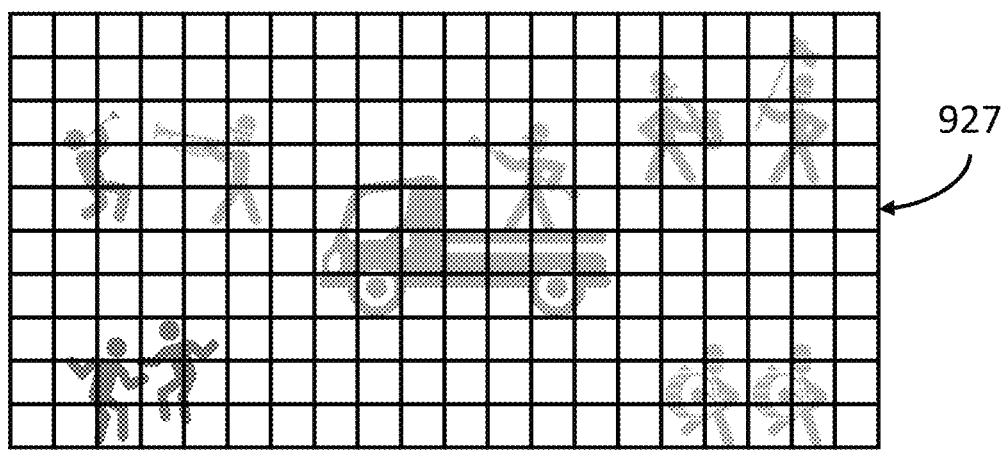
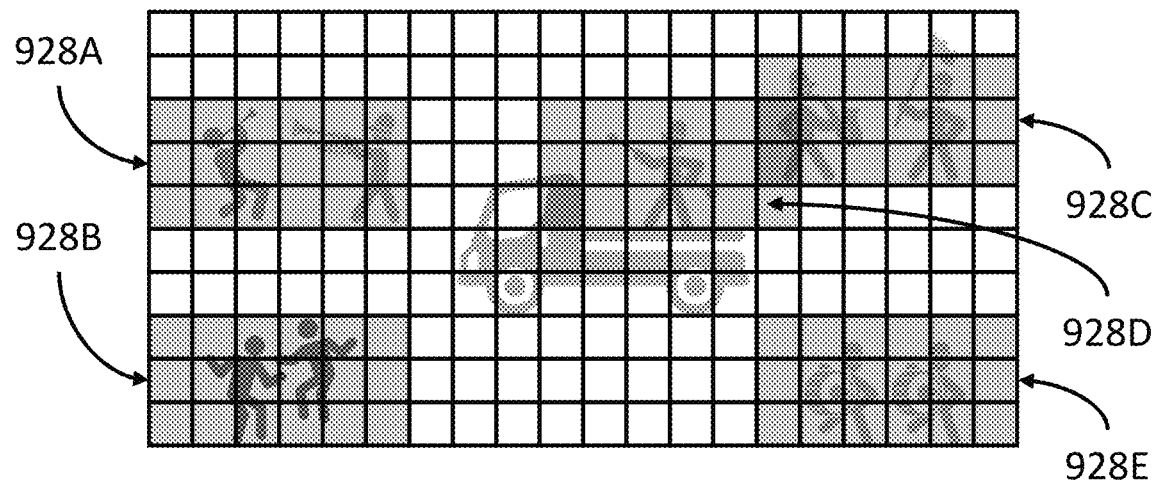
FIG. 9A

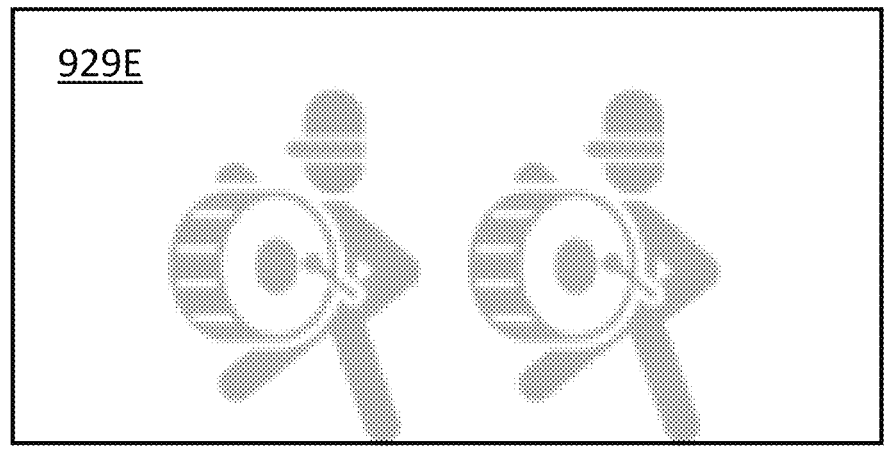
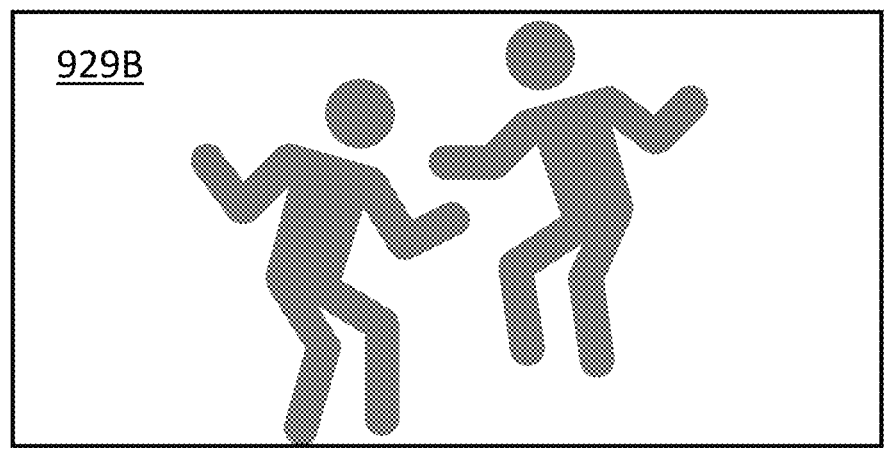
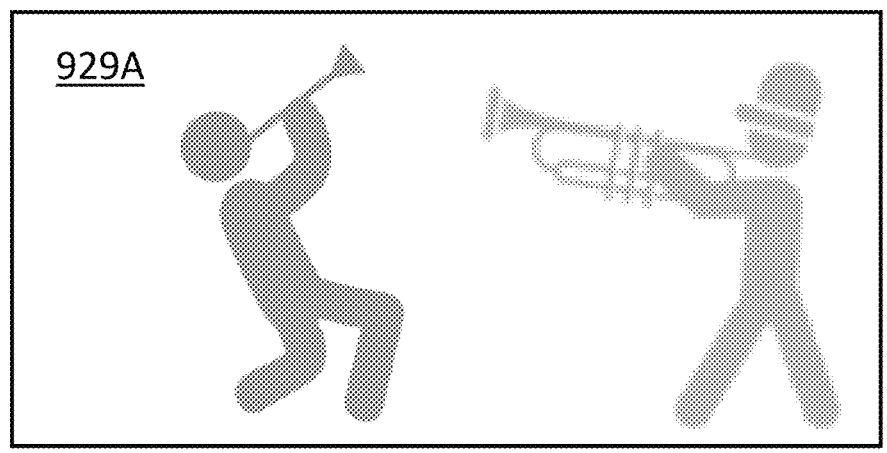
FIG. 9B $$CT1 = \begin{Bmatrix} (A)(AV1); t_0(A)(AV1) \\ (A)(AV2); t_0(A)(AV2) \\ (A)(AV3); t_0(A)(AV3) \\ (B)(AV1); t_0(B)(AV1) + BFOS* \\ (B)(AV2); t_0(B)(AV2) + BFOS* \\ (B)(AV3); t_0(B)(AV3) + BFOS* \end{Bmatrix}$$

grid size = 10 → gx

| | 0 | 1 | 2 | 3 | 4 | 5 | 6 | 7 | 8 | 9 |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 18 | 0 | 0 | 0 | 0 | 0 |
| 5 | 0 | 27 | 24 | 21 | 18 | 0 | 0 | 0 | 0 | 0 |
| 6 | 0 | 27 | 24 | 21 | 18 | 15 | 0 | 0 | 0 | 0 |
| 7 | 0 | 0 | 24 | 21 | 0 | 0 | 0 | 0 | 0 | 0 |
| 8 | 30 | 27 | 24 | 21 | 18 | 0 | 0 | 0 | 0 | 0 |
| 9 | 0 | 0 | 0 | 12 | 0 | 0 | 0 | 0 | 0 | 0 |

↓ gy

→ = $\begin{cases} \Delta x = +3 \text{ pixels} \\ \Delta y = 0 \text{ pixels} \end{cases}$  $t_s = \sqrt{t_{vx}^2 + t_{vy}^2}$ direction motion = $\sqrt{(\sum t_{vx}(x,y))^2 + (\sum t_{vy}(x,y))^2}$ absolute motion = $\sum t_s(x,y)$ character (convergence) score = $\dfrac{direction\ motion}{absolute\ motion} = \dfrac{399}{399}$

FIG. 18A grid size = 10 → gx

|   | 0 | 1 | 2 | 3 | 4 | 5 | 6 | 7 | 8 | 9 |
|---|---|---|---|---|---|---|---|---|---|---|
| 0 | 0 | 0 | 0 | 0 | 0 | 0 | 0 | 0 | 0 | 0 |
| 1 | 0 | 0 | -6 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 18 | 0 | 0 | 0 | 0 | 0 |
| 5 | 0 | 27 | 24 | 21 | 18 | 0 | 0 | 0 | 0 | 0 |
| 6 | 0 | 27 | 24 | 21 | 18 | 15 | 0 | 0 | 0 | 0 |
| 7 | 0 | 0 | 24 | 21 | 0 | 0 | 0 | 0 | 0 | 0 |
| 8 | 30 | 27 | 24 | 21 | 18 | 0 | 0 | 0 | 0 | 0 |
| 9 | 0 | 0 | 0 | 12 | 0 | 0 | 0 | 0 | 0 | 0 |

↓ gy

→ = $\begin{cases} \Delta x = +3 \text{ pixels} \\ \Delta y = 0 \text{ pixels} \end{cases}$ $$t_s = \sqrt{t_{vx}^2 + t_{vy}^2}$$

$$\text{direction motion} = \sqrt{(\sum t_{vx}(x,y))^2 + (\sum t_{vy}(x,y))^2}$$

$$\text{absolute motion} = \sum t_s(x,y)$$

$$\text{character (convergence score)} = \frac{\text{direction motion}}{\text{absolute motion}} = \frac{393}{405}$$

FIG. 18B

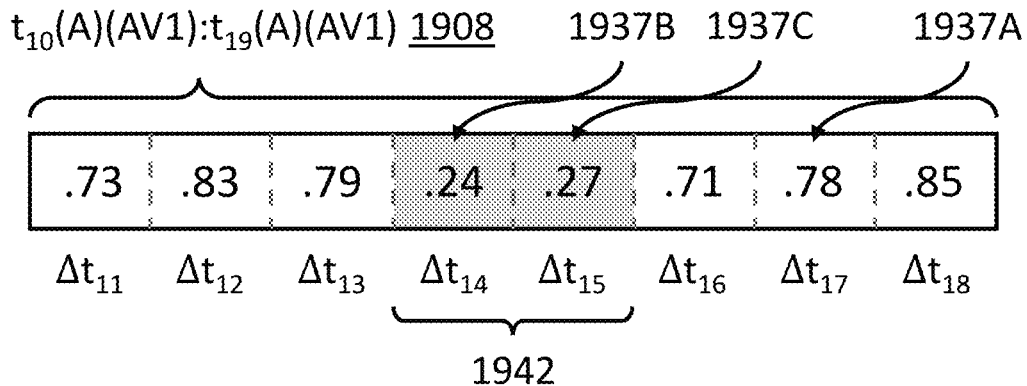

$t_{10}(A)(AV1):t_{19}(A)(AV1)$ 1908   1937B  1937C   1937A

| .73 | .83 | .79 | .24 | .27 | .71 | .78 | .85 |

$\Delta t_{11}$  $\Delta t_{12}$  $\Delta t_{13}$  $\Delta t_{14}$  $\Delta t_{15}$  $\Delta t_{16}$  $\Delta t_{17}$  $\Delta t_{18}$

1942

$$\begin{Bmatrix} (A)(AV1); t_0(A)(AV1) \\ (A)(AV2); t_0(A)(AV2) \\ (A)(AV3); t_0(A)(AV3) \\ (B)(AV1); t_0(B)(AV1) + BFOS^* \\ (B)(AV2); t_0(B)(AV2) + BFOS^* + ADJ(2,2) \\ (B)(AV3); t_0(B)(AV3) + BFOS^* + ADJ(3,3) \end{Bmatrix} \quad \underline{CT2}$$

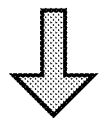

$$\begin{Bmatrix} (A)(AV1); t_0(A)(AV1); l_1; d_1 \\ (A)(AV1); t_0(A)(AV1); l_2; d_2 \\ (A)(AV2); t_0(A)(AV2) \\ (A)(AV3); t_0(A)(AV3) \\ (B)(AV1); t_0(B)(AV1) + BFOS^* \\ (B)(AV2); t_0(B)(AV2) + BFOS^* + ADJ(2,2) \\ (B)(AV3); t_0(B)(AV3) + BFOS^* + ADJ(3,3) \end{Bmatrix} \quad 1944$$

FIG. 19

METHODS AND SYSTEMS FOR AUTOMATED SYNCHRONIZATION AND OPTIMIZATION OF AUDIO-VISUAL FILES

CROSS-REFERENCE

This application claims the benefit of U.S. Provisional Application No. 62/988,070, filed Mar. 11, 2020, which is hereby incorporated herein by reference.

TECHNICAL FIELD

This invention relates generally to the field of video processing and post-production. More specifically, the invention discloses new and useful methods and systems for autonomously processing one or more audio-visual (AV) files and intelligently compiling the one or more AV files into a single, new, seamless, and optimized video.

BACKGROUND

Video post-production is the process of editing and compiling one or more individually recorded video segments into a single video that is ready for consumption. For example, when watching a conversation between two actors in a movie, the perspective presented to the viewer will likely change multiple times throughout the conversation—from a view focused on the face of the first actor to a view focused on the face of the second actor, or to a view that includes the profile of both actors. To achieve this effect, the conversation was recorded by multiple video cameras at the same time—one camera fixed on the face of the first actor, a second camera fixed on the face of the second actor, and a third camera recording the conversation from a perspective that captured the profile of both actors, for example. Then, during post-production, one or more video editing professionals will decide when to use the perspective from which camera for the final cut of the movie, cut the individual recordings into the necessary segments, and then compile the selected segments into the final cut of the movie that will ultimately be shown to viewers.

This post-production process is a generally manual process that takes trained video editing professionals many hours. There are a slew of video editing software products available to video editors that digitalize the process, but they generally do not automate the process. As a result, for people untrained in video editing processes and techniques, compiling multiple individually recorded video segments into a single, compelling video can take an prohibitive amount of time and effort. The lack of automation tools thus prevents the average person from creating a video that comes anywhere close to resembling a professionally produced movie.

SUMMARY

In one aspect, disclosed herein are methods and systems for autonomously generating an optimized audio-visual (AV) file from an original AV file. In some embodiments, a method comprises: a) generating a vector cube comprising a plurality of vector matrices for an original AV file; b) for each vector matrix within the vector cube, determining an optimal subframe having a subframe size larger than or equal to a predetermined minimum subframe size; and c) generating an optimized AV file based on the optimal subframes determined for each of the vector matrices within the vector cube. In some embodiments, at least one of the optimal subframes has a subframe size smaller than the frame size of the original AV file. In some embodiments, he optimal subframe determined for each vector matrix within the vector cube must have a subframe score higher than each other possible subframe of the same subframe size within the vector matrix. In some embodiments, the optimal subframe determined for each vector matrix within the vector cube must have an activity ratio higher than that of each other possible subframe of the same subframe size within the vector matrix. In some embodiments, the method further comprises applying a clustering filter to the vector cube. In some embodiments, the method further comprises applying a normalizing filter to the vector cube. In some embodiments, the method further comprises applying a characterizing filter to the vector cube. In some embodiments, generating the optimized AV file based on the optimal subframes determined for each of the vector matrices comprises cropping, panning, or zooming between the optimal subframes determined for two or more vector matrices representing two or more respective and consecutive segments of the original AV file. In some embodiments, generating the optimized AV file based on the optimal subframes determined for each of the vector matrices comprises cropping, panning, or zooming between the optimal subframes determined for two vector matrices representing consecutive segments of the original AV file only after a predetermined minimum number of consecutive segments since a previous cropping, panning, or zooming. In some embodiments, generating the optimized AV file based on the optimal subframes determined for each of the vector matrices comprises cropping, panning, or zooming between the optimal subframes determined for two vector matrices representing consecutive segments of the original AV file only if the optimal subframes have at least a predetermined minimum percentage of overlapping cells. In some embodiments, the optimal subframes must have the same aspect ratio of the original AV file. In some embodiments, the optimal subframes have a uniform and different aspect ratio than that of the original AV file. In some embodiments, the vector cube is generated using motion vectors. In some embodiments, the vector cube is generated using pixel deltas. In some embodiments, generating the vector cube for the original AV file comprises: a) dividing the original AV file into a plurality of still images; b) overlaying a grid of cells atop each of the still images within the plurality of still images; c) generating the plurality of vector matrices by calculating a cell score between corresponding cells within the grids of each consecutive pair of still images; and d) compiling the plurality of vector matrices into the vector cube. In some embodiments, the original AV file is divided into the plurality of still images based on a predetermined time interval between each still image. In some embodiments, the grid of cells overlaid atop each of the still images within the plurality of still images has a predetermined grid size.

In another aspect, disclosed herein are methods and systems for generating a vector cube from an audio-visual (AV) file. In some embodiments, a method comprises: a) dividing the AV file into a plurality of still images; b) overlaying a grid of cells atop each of the still images within the plurality of still images; c) generating a plurality of vector matrices by calculating a cell score between corresponding cells within the grids of each consecutive pair of still images; and d) compiling the plurality of vector matrices into a vector cube. In some embodiments, the AV file is divided into the plurality of still images based on a predetermined time interval between each still image. In some embodiments, the grid of cells overlaid atop each of the still images within the plurality of still images has a predetermined grid size. In some embodiments, the cell scores are calculated using pixel deltas. In some embodiments, the cell scores are calculated using motion vectors. In some embodiments, the method further comprises applying a clustering filter to the vector cube. In some embodiments, applying the clustering filter to the vector cube comprises: a) for each cell within each vector matrix within the vector cube, determining the likelihood that the cell is part of a larger contiguous object in motion; and b) rescoring the cell score of the cell based on the likelihood that the cell is part of a larger contiguous object in motion. In some embodiments, determining the likelihood that the cell is part of a larger contiguous object in motion comprises comparing the cell score of the cell to the cell score of one or more neighboring cells. In some embodiments, the method further comprises applying a normalizing filter to the vector cube. In some embodiments, applying the normalizing filter to the vector cube comprises: a) determining a cube average by calculating the average cell score for all cells within the vector cube; b) for each series of corresponding cells within the plurality of vector matrices, determining a cell average by calculating the average cell score across the series of corresponding cells; c) determining a normalization ratio for the series of corresponding cells by dividing the cube average by the cell average; and d) multiplying the cell score of each cell within the series of corresponding cells by the normalization ratio. In some embodiments, the method further comprises applying a characterizing filter to the vector cube. In some embodiments, applying the characterizing filter to the vector cube comprises, for each cell within each vector matrix within the vector cube, rescoring the cell score based on the cell's alignment with a predetermined action type.

In another aspect, disclosed herein are methods and systems for generating an optimized audio-visual (AV) file from an original AV file. In some embodiments, a method comprises: a) generating a vector cube comprising a plurality of vector matrices for an original AV file; b) for each vector matrix within the vector cube, identifying a plurality of possible subframes; c) for each vector matrix within the vector cube selecting one or more multiplex subframes from the plurality of possible subframes; and d) generating an optimized AV file based on the multiplex subframes selected for each of the vector matrices within the vector cube. In some embodiments, the possible subframes have the same subframe size. In some embodiments, the subframe size is a predetermined subframe size. In some embodiments, the possible subframes have a predetermined subframe size and identifying the plurality of possible subframes comprises: a) identifying a first possible subframe of the predetermined subframe size having a subframe score higher than each other possible subframe of the same subframe size within the vector matrix; and b) identifying a second possible subframe of the predetermined subframe size having a subframe score higher than each other possible subframe of the same subframe size within the vector matrix except for the first possible subframe. In some embodiments, the method further comprises: a) determining if the first and second possible subframes overlap; and b) in response to determining that the first and second possible subframes overlap, determining an amount of overlap and rescoring the subframe score of the second possible subframe based at least in part on the amount of overlap. In some embodiments, the method further comprises selecting the second possible subframe as a multiplex subframe only if the rescored subframe score of the second possible subframe is greater than or equal to a predetermined percentage of a vector matrix score of the vector matrix. In some embodiments, the possible subframes must be proportional in size to an original frame size of the original AV file. In some embodiments, the vector cube is generated using motion vectors. In some embodiments, the vector cube is generated using pixel deltas. In some embodiments, the method further comprises applying a clustering filter to the vector cube. In some embodiments, the method further comprises applying a clustering filter to the vector cube. In some embodiments, the method further comprises applying a characterizing filter to the vector cube. In some embodiments, generating the vector cube for the original AV file comprises: a) dividing the original AV file into a plurality of still images; b) overlaying a grid of cells atop each of the still images within the plurality of still images; c) generating the plurality of vector matrices by calculating a cell score between corresponding cells within the grids of each consecutive pair of still images; and d) compiling the plurality of vector matrices into the vector cube. In some embodiments, the original AV file is divided into the plurality of still images based on a predetermined time interval between each still image. In some embodiments, he grid of cells overlaid atop each of the still images within the plurality of still images has a predetermined grid size.

In another aspect, disclosed herein are methods and systems for generating an optimized audio-visual (AV) file from two or more parallel AV files. In some embodiments, a method comprises: a) synchronizing a first parallel AV file and a second parallel AV file; b) generating a first vector cube for the first parallel AV file by generating a first plurality of vector matrices and compiling the first plurality of vector matrices into the first vector cube; c) generating a second vector cube for the second parallel AV file by generating a second plurality of vector matrices and compiling the second plurality of vector matrices into the second vector cube; and d) generating an optimized AV file based on the first and second vector cubes. In some embodiments, generating the optimized AV file based on the first and second vector cubes comprises selecting segments from both the first and second parallel AV files to be included in the optimized AV file. In some embodiments, selecting segments from both the first and second parallel AV files to be included in the optimized AV file comprises comparing a first vector matrix from the first plurality of vector matrices to corresponding second vector matrix from the second vector cube and determining which vector matrix has a higher frame score. In some embodiments, generating the optimized AV file based on the first and second vector cubes comprises identifying local breakpoints within the each of the first and second vector cubes and identifying global breakpoints based on the local breakpoints. In some embodiments, synchronizing the first and second parallel AV files comprises performing a series of waveform maximization functions on the first and second parallel AV files. In some embodiments, the first and second vector cubes are generated using motion vectors. In some embodiments, the first and second vector cubes are generated using pixel deltas. In some embodiments, the method further comprises applying a clustering filter to the vector cube. In some embodiments, the method further comprises applying a normalizing filter to the vector cube. In some embodiments, the method further comprises applying a characterizing filter to the vector cube. In some embodiments, generating the first vector cube for the first parallel AV file comprises: a) dividing the first parallel AV file into a plurality of still images; b) overlaying a grid of cells atop each of the still images within the plurality of still images; and c) generating the first plurality of vector matrices by calculating a cell score between corresponding cells within the grids of each consecutive pair of still images. In some embodiments, he first parallel AV file is divided into the plurality of still images based on a predetermined time interval between each still image. In some embodiments, the grid of cells overlaid atop each of the still images within the plurality of still images has a predetermined grid size.

For example, in one application of the present invention, three friends individually record a fourth friend skateboarding on a half-pipe using their respective cell phone cameras, thereby generating three parallel audio-visual (AV) files (i.e., three individual audio-visual recordings of the same action). Later, the four friends get together and upload the three parallel AV files into the system described herein by the present disclosure, which autonomously synchronizes the three parallel AV files, characterizes the action recorded in the three parallel AV files, and identifies which segment of which of the three AV files best captures the recorded action at each second throughout the duration of the recorded action. The system then compiles the identified segments into a single video that seamlessly portrays the fourth friend skateboarding on the half-pipe from the three different perspectives of the three friends who individually recorded the fourth friend skateboarding on their three respective cell phone cameras.

In another example, a professor wishing to record his lecture for his students sets up three video cameras before the lecture—one camera in the back left corner of the lecture hall, a second camera in the back right corner of the lecture hall, and a third camera in the center of the lecture hall—and begins recording from all three video cameras at the beginning of the lecture. When the lecture ends, the professor stops the recording at the three cameras and uploads the three parallel AV files from the three respective video cameras into the system described herein by the present disclosure. The system then autonomously synchronizes the three parallel AV files, characterizes the action recorded in the three parallel AV files, and identifies which segment of which of the three AV files best captures the recorded action at each second throughout the duration of the recorded action. Finally, the system compiles the identified segments into a single video that seamlessly showcases the professor's lecture in a compelling and dynamic fashion, intelligently jumping between the perspectives of the three video cameras.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4 illustrates a process for generating a vector cube;

FIGS. 9A & 9B illustrate a process for multiplexing an audio-visual file;

FIGS. 18A & 18B illustrate a process for characterizing a vector cube;

FIG. 19 depicts a process for identifying local breakpoints;

DETAILED DESCRIPTION OF THE DRAWINGS

Numerous embodiments of the invention will now be described in detail with reference to the accompanying figures. The following description of the embodiments of the invention is not intended to limit the invention to these embodiments but rather to enable a person skilled in the art to make and use this invention. Variations, configurations, implementations, and applications described herein are optional and not exclusive to the variations, configurations, implementations, and applications they describe. The invention described herein can include any and all permutations of these variations, configurations, implementations, and applications.

In the following description, numerous specific details are set forth in order to provide a thorough understanding of the invention. It will be apparent, however, to one skilled in the art that the invention can be practiced without these specific details.

Reference in this specification to "one embodiment" or "an embodiment" or "some embodiments" means that a particular feature, structure, or characteristic described in connection with the embodiment(s) is included in at least one embodiment of the invention. The appearances of the phrase "in one embodiment" or "in some embodiments" in various places in the specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments but no other embodiments.

Optimization of Audio-Visual (AV) Files

Figure 1:
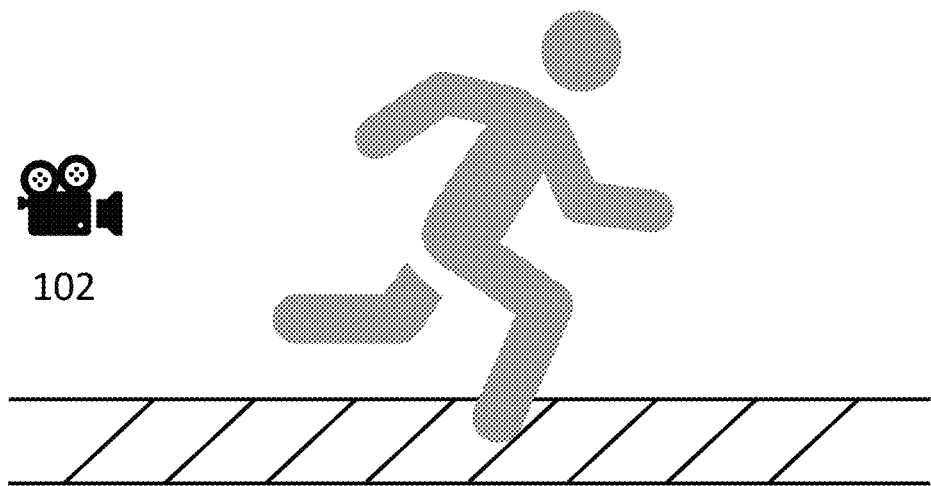
FIG. 1 illustrates an exemplary recording of an audio-visual file.
Figure 2:
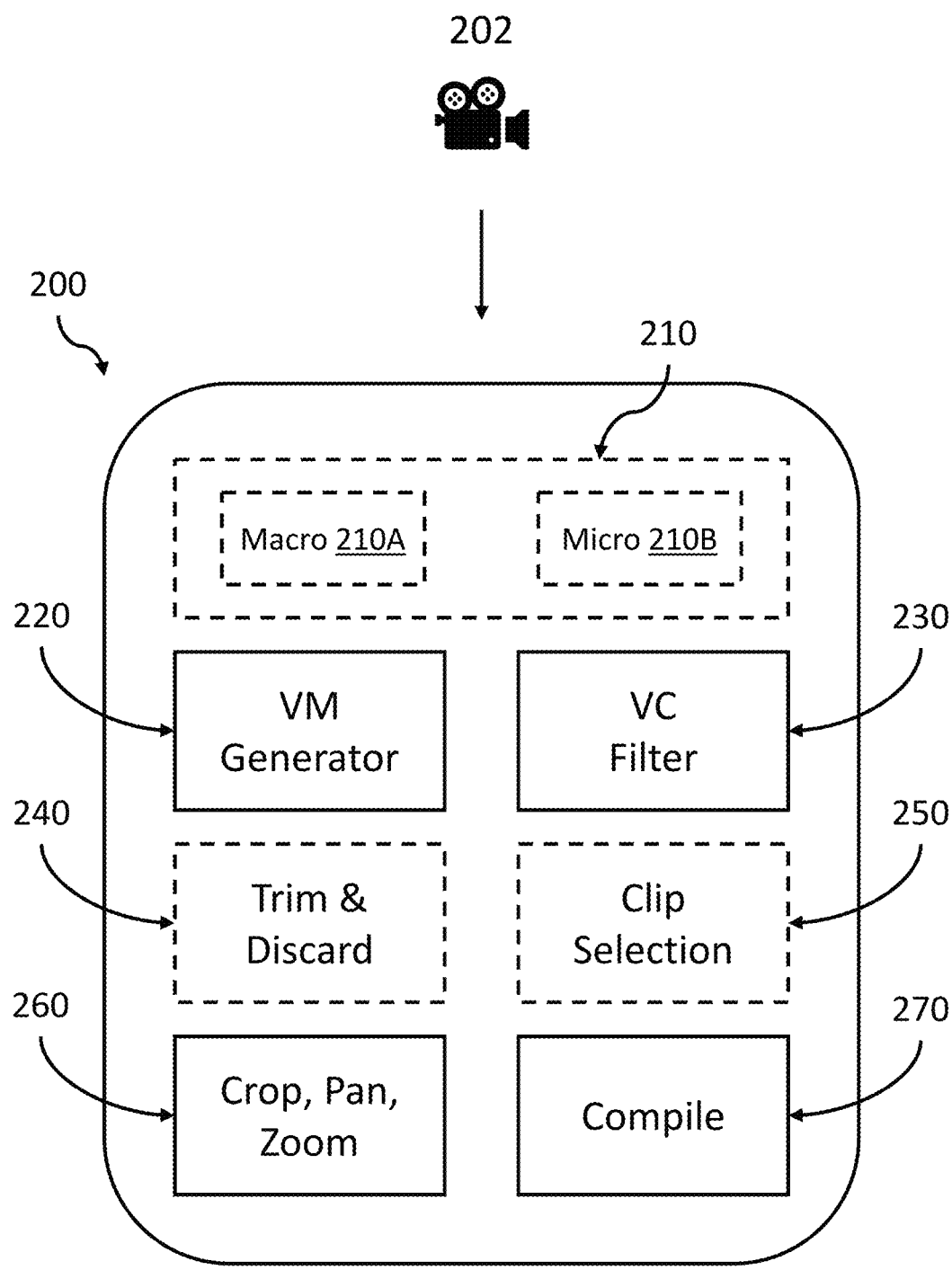
FIG. 2 depicts a diagram of a system for autonomously generating an optimized audio-visual file from an original audio-visual file.

As mentioned above, disclosed herein are methods and systems for autonomously generating an optimized audio-visual (AV) file from an original AV file. FIG. 1 illustrates an exemplary recording of an AV file. In the example illustrated in FIG. 1, a single video camera 102 records a video (e.g., an AV file) of a man running on a sidewalk. In this example, the cameraman is attempting to keep the running man within the center of the camera frame. Although there is only one central figure being recorded (i.e., the running man), it may be difficult to keep the central figure within the center of the frame, whether the camera is being wielded by hand, on a tripod, or mounted on rails. After recording the video, the cameraman or another video editing professional can use digital video editing tools to manually ensure that the central figure remains in the center of the frame during the post-production process, as described above, which may take even trained professional many hours. FIG. 2 depicts a diagram of a system 200 for autonomously generating an optimized AV file from an original AV file. In some embodiments, the system 200 includes one or more modules (e.g., software modules), such as a vector matrix module 220, a vector cube filter module 230, a crop, pan, zoom (CPZ) module 260, and a compiling module 270. In general, the modules of the system 200 function cooperatively to receive an original AV file, generate a vector cube for the original AV file, and use the vector cube to create an optimized AV file from the original AV file. The various functions of the system 200 and the modules included therein are described in further detail below. In general, any of the systems, method, processes, and operations described below in the context of a single AV file may also be applied to a plurality of AV files (e.g., two or more parallel AV files), as described below.

Generating Vector Matrices and Vector Cubes

In some embodiments, the system 200 is configured to receive an original audio-visual (AV) file (e.g., from a video source 202), which may include one or more AV clips. After receiving the original AV file, the system 200 can then generate a unique vector cube for each of the AV clips included in the original AV file. Then, using the vector cubes generated for each of the AV clips included in the AV file, the system 200 can generate an optimized AV file from the original AV file, as described below.

Figure 3:
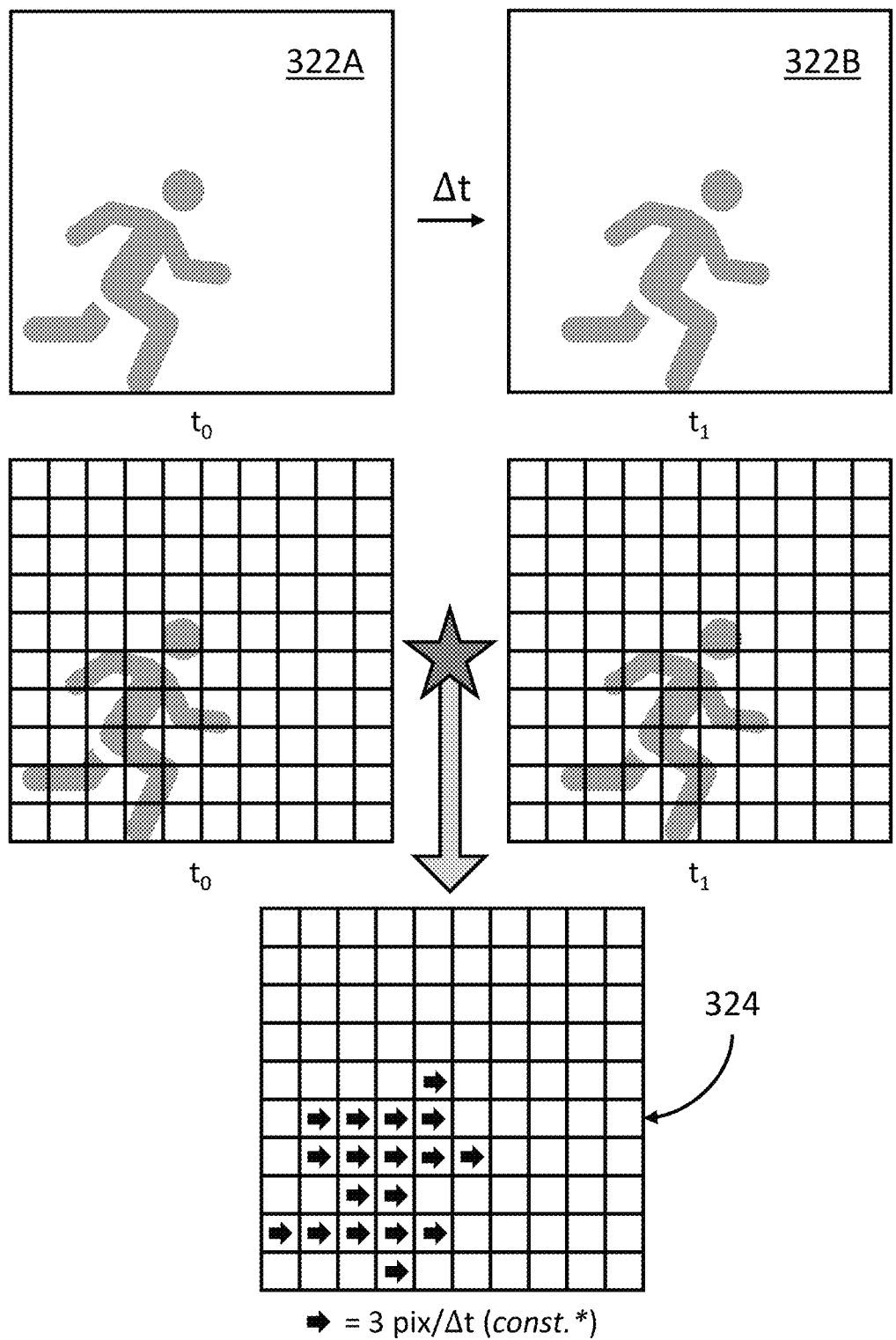
FIG. 3 illustrates a process for generating a vector matrix.

FIGS. 3 & 4 illustrate an exemplary process for generating a vector cube for an original AV file. In general, a "vector cube" is a numerical or algebraic representation of the motion captured on an audio-visual (AV) file. In some embodiments, a vector cube is a compilation of two or more vector matrices. In some embodiments, a vector matrix is a numerical or algebraic representation of the motion captured on an AV file within a given interval of time ($\Delta t$; e.g., one second). In some embodiments, the generation of a vector cube for an AV clip begins with the vectorization of the AV clip, as depicted by FIG. 3. To vectorize the AV clip, the system 200 begins by extracting still images (also referred to as "stills") from the AV clip at a given time interval $\Delta t$ (e.g., one still image per second) beginning with the initial frame of the clip at time $t_0=0$ s. For example, for a 60 second clip, if the interval is 1 s, the system 200 will extract 61 still images from the clip, the first still at time $t_0=0$ s and the $61^{st}$ still at time $t_{60}=60$ s. After extracting the stills from the AV clip, the system 200 will then create a vector matrix for the motion that occurs in the time elapsed between each pair of consecutive stills (also referred to as a "segment" of the AV clip). For example, for the 60 second clip described above, the system 200 would create a total of 60 vector matrices.

For example, FIG. 3 depicts the creation of a vector matrix for the motion occurring in the first second of an AV clip of the man running on the sidewalk illustrated in FIG. 1. In this example, the first still 322A and second still 322B extracted from the AV clip (for time $t_0=0$ s and time $t_1=1$ s, respectively) show the running man moving from the left to the right. The system 200 overlays a grid (also referred to as a "grid box" or a "grid of cells") atop the stills 322 and then uses computer vision techniques to identify any objects that appear within the boxes of the grid (also referred to as "cells") and calculate a motion vector (also referred to as a "cell score") for those objects (e.g., how many pixels those objects moved from the first still to the second still and in which direction) within each cell. In this example, the system 200 recognizes objects in each cell occupied by the running man and determines that, between the first still and the second still (i.e., in the first segment of the AV clip), the vector motion of each of those objects moves 3 pixels to the right. The system 200 records a cell score (in the example illustrated by FIG. 3, a motion vector) of +3 pixels to the right in each cell where an object was detected. The resultant vector matrix 324 is depicted in FIG. 3.

The system 200 then repeats this process to create a vector matrix for the motion that occurs between each segment of the AV clip. For example, after creating a first vector matrix 424A for the motion between the first still and the second still of the AV clip, the system 200 creates a second vector matrix 424B for the motion between the second still and the third still extracted from the AV clip (for times $t_1=1s$ and $t_2=2s$, respectively; i.e., the second segment of the AV clip), as depicted by FIG. 4. Vector matrix 424B implies that, between times $t_1=1s$ and $t_2=2s$ of the AV clip, the running man continued to move from left to right at a rate of 3 pixels/second. The system 200 continues to create vector matrices 424 for the motion between consecutive stills of the AV clip until it reaches the final frame of the AV clip. For example, if the AV clip is 60 seconds long and the interval is $1s$, the system 200 will create 60 different vector matrices 424, the first vector matrix for the segment between times $t_0=0s$ and $t_1=1s$ (e.g., vector matrix 424A) and the 60th vector matrix for the segment between times $t_{59}=59s$ and $t_{60}=60s$. Once the system 200 finishes creating the vector matrices for the AV clip, the system 200 combines all of the vector matrices 424 to generate a vector cube 426 for the AV clip, as illustrated in FIG. 4. The system 200 will generate a vector cube 426 for each AV clip included in the original AV file.

In some embodiments, the system 200 alternatively or additionally generates a vector cube or a vector matrix using pixel deltas as the cell scores, as opposed to motion vectors. For example, in some embodiments, instead of using computer vision techniques to identify objects that appear within a grid overlaid atop a still image and calculate motion vectors for those objects, the system 200 can use computer vision techniques to calculate a percent change in the RGB value of each pixel (also referred to as a "pixel delta") within each grid cell from one still to the next. The vector matrix generated for the motion occurring between the two stills can then be expressed in terms of pixel deltas.

Crop, Pan, Zoom (CPZ)

As mentioned above, in some embodiments, the system 200 is configured to generate an optimized AV file from an original AV file. In some embodiments, the system 200 begins by generating a vector cube for the original AV file, as described above. In some embodiments, after generating a vector cube for the original AV file, the system 200 then uses the vector cube generated for the original AV file to crop, pan, or zoom within stills from the original AV file, such as by using the crop, pan, zoom module 260, as described below.

Figure 5:
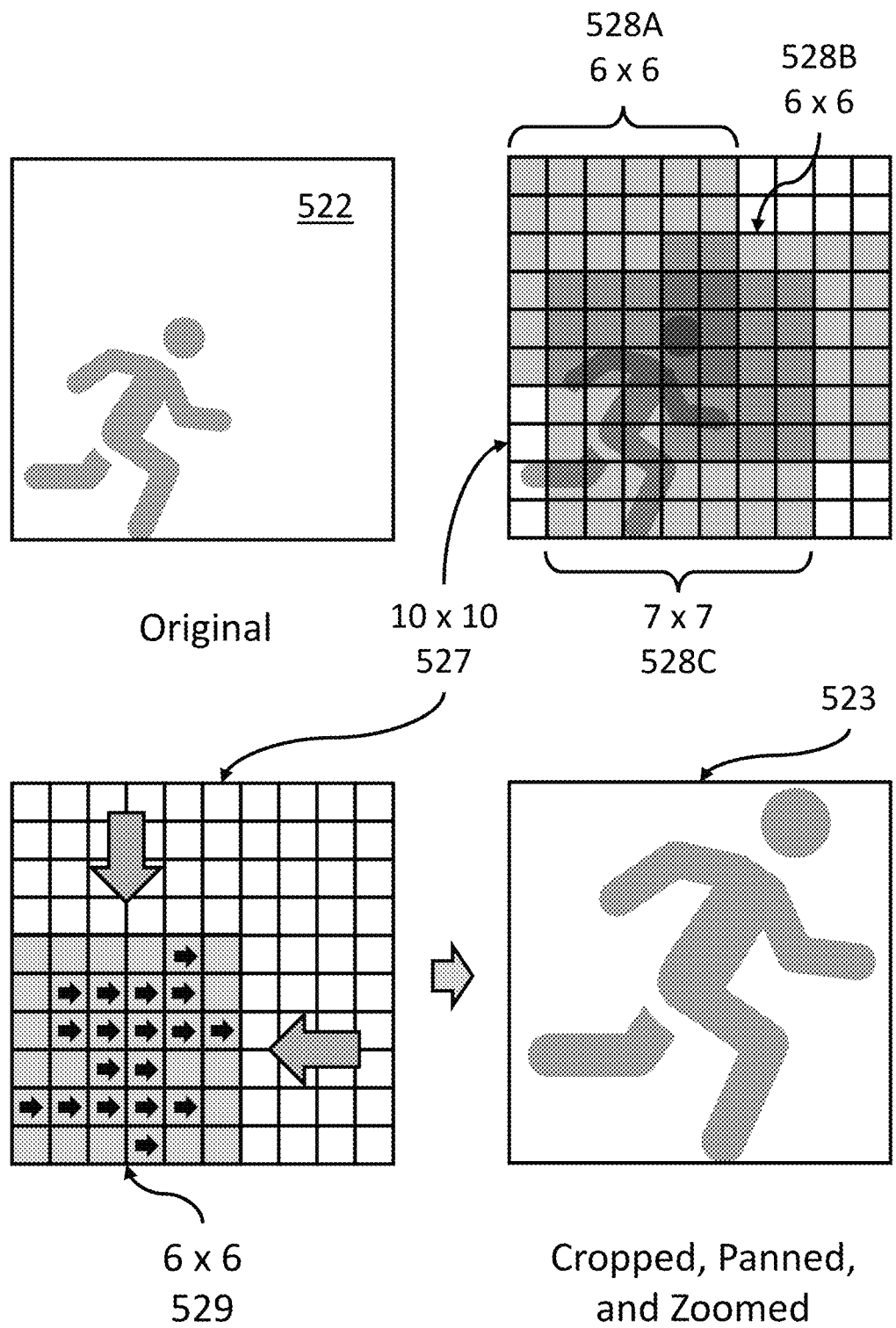
FIG. 5 illustrates a process for cropping, panning, or zooming within a video.

FIG. 5 illustrates an exemplary process for cropping, panning, or zooming within a still image from an original AV file. In some embodiments, for example, as illustrated in FIG. 5, the system 200 retrieves a vector matrix of a segment of the original AV file (e.g., vector matrix 424A, as illustrated in FIG. 4), determines the aspect ratio of the grid box 527 (e.g., 1:1) and the size of the grid box 527 (e.g., in this example, 10×10; hereinafter, the "original frame size"), and identifies every possible area with the same aspect ratio and a smaller size than the original frame size (hereinafter, "subframes") within the grid box 527. For example, FIG. 5 depicts two exemplary possible 6×6 subframes (subframes 528A and 528B) and one exemplary possible 7×7 subframe (subframe 528C) within the 10×10 grid box 527. As illustrated in FIG. 5, all three of the possible subframes 528 have the same aspect ratio of the grid box 527 (e.g., 1:1). In some embodiments, the system 200 only identifies possible subframes having a subframe size larger than or equal to a predetermined or user defined minimum scale of the original frame size (e.g., in this example, larger than or equal to 6×6, or 60%). However, the system 200 may use any logic to identify possible subframes. For example, in some embodiments, the system 200 identifies possible subframes having a uniform but different aspect ratio (hereinafter, a "second aspect ratio") to that of the grid box. For example, again considering the grid box 527 (as illustrated in FIG. 5), if a user of the system 200 selects a second aspect ratio of 2:1 and a minimum scale of 50%, the system 200 would be able to identify a total of six possible subframes within the grid box 527, all having a size of 10×5.

In some embodiments, after identifying all of the possible subframes 528, the system 200 then calculates a subframe score for each possible subframe 528 (e.g., by summing all of the cell scores within the possible subframe) and selects the smallest possible subframe 528 with the highest subframe score as the optimal subframe 529 for the vector matrix. For example, in the example illustrated in FIG. 5, the system 200 identifies the 6×6 subframe in the bottom left corner of the grid box 527 as the smallest possible subframe with the highest subframe score, as it contains all of the motion within the vector matrix. Or, for example, in some embodiments, the system 200 selects the possible subframe 528 with the subframe score that maximizes the equation y=((sum of cell scores within the possible subframe)−(sum of cell scores outside of the possible subframe))/(sum of cell scores within the grid box) as the optimal subframe 529. In another example, in some embodiments, the system 200 selects the smallest possible subframe 528 that has a subframe score higher than or equal to a predetermined or user defined value for the sum of the cell scores within the possible subframe divided by the sum of the cell scores outside of the possible subframe (hereinafter, the "in/out ratio" or "activity ratio") as the optimal subframe 529. However, the system 200 may use any logic to select an optimal subframe 529.

In some embodiments, the system 200 is configured to identify or select an optimal subframe 529 for each vector matrix within a vector cube generated for an AV clip. After identifying or selecting an optimal subframe 529 for each vector matrix within the vector cube, the system 200 can then use the optimal subframes 529 to generate an optimized AV file. For example, in some embodiments, beginning with the first still image from the original AV clip (hereinafter, "original still image" or "original still"), the system 200 crops, pans, or zooms within the first still image according to the optimal subframe 529 identified for the vector matrix representing the segment that the still image precedes (or begins). For example, in the example illustrated in FIG. 5, still image 522 represents the first still image from an original AV clip (e.g., time $t_0$=0 s). As illustrated in FIG. 5, optimal subframe 529 has been identified for the vector matrix representing the segment from time $t_0$=0 s to time $t_1$=1 s. Accordingly, the system 200 then crops, pans, or zooms within still image 522 to the optimal subframe 529, as illustrated in FIG. 5, to generate an optimized still image 523 (focusing in on the running man). In some embodiments, the system 200 continues generating optimized still images 523 from original still images 522 according to the optimal subframes 529 identified for the vector matrices representing their subsequent segments in this way until the end of the original AV clip. Finally, in some embodiments, the system 200 compiles the optimized still images 523 into an optimized AV clip, such as by using the compiling module 270. The system 200 can generate an optimized AV clip for each AV clip included in the original AV file, and compile the optimized AV clips into an optimized AV file. However, the system 200 can use optimal subframes 529 to generate an optimized AV file in any other way. For example, in some embodiments, the system 200 can apply optimal subframes 529 with a time offset (e.g., plus or minus x segments). For example, with a time offset of +1 segments, the system 200 would use an optimal subframe 529 selected for a vector matrix to create an optimized still image from the original still image 522 that ends the segment for which the vector matrix was generated (as opposed to the original still image that begins the segment).

In some embodiments, buffers may be applied to cropping, panning, and zooming to ensure a smooth optimized AV clip. For example, in some embodiments, the system 200 adheres to a predetermined or user defined minimum number of segments between crops, pans, and zooms. Then, when the system 200 crops, pans, or zooms to a first optimal subframe 529 within a particular original still 522 to generate an optimized still 523 (as illustrated in FIG. 5), the system 200 will continue to use the first optimal subframe identified for the particular original still to generate the optimized stills from the subsequent original stills until the system 200 reaches the predetermined or user defined minimum number of segments. In such an embodiment, once the system 200 reaches the predetermined or user defined minimum of segments, the system 200 will generate an optimized still for the next original still (i.e., the first original still following the predetermined or user defined minimum number of segments between CPZs) using a second optimal subframe identified for the vector matrix representing the segment following that next original still. Then, accordingly, the system 200 will continue generating optimized stills from the subsequent original stills until the system 200 again reaches the predetermined or user defined minimum number of segments, and so on and so forth, until the system 200 finishes generating optimized stills for the original AV clip. Or for example, in some embodiments, after the system 200 crops, pans, or zooms to a first optimal subframe within a particular original still to generate an optimized still, the system 200 uses a second optimal subframe to generate an optimized still for the subsequent original still only if the second optimal subframe shares a predetermined or user defined percentage of overlapping cells with the first optimal subframe. However, the system 200 may use any logic to apply buffers to cropping, panning, or zooming.

Vector Cube Filters

In some embodiments, before generating an optimized AV clip using a vector cube generated for an original AV clip, the system 200 can apply a filter (also referred to as a "vector cube filter") to the vector cube, such as by using the VC filter module 230, as described below. In general, in some embodiments, the system 200 can apply a vector cube filter to a vector cube to increase the effectiveness of functions performed using the vector cube, such as cropping, panning, and zooming (as described above) and multiplexing (as described below). In general, a vector cube filter is a transformation operation performed on each cell of each vector matrix included in the vector cube.

In some embodiments, the system 200 can apply a characterizing vector cube filter (also referred to as a "characterizing filter") to a vector cube. In general, a characterizing filter rescores the cell scores within a vector matrix according to how well the motion represented the cell scores aligns with a particular character of motion (also referred to as "motion character"). In some embodiments, the motion character may be convergent or divergent. However, motion may be characterized in any other way. In some embodiments, before a characterizing filter is applied to a vector cube, the motion character for the characterizing filter must be determined. In some embodiments, the motion character is predetermined or autonomously determined by the system 200, such as by using one or more computer vision or machine learning techniques. In some embodiments, the system 200 requires a user to manually submit the a motion character for the characterizing filter. Once the motion character has been determined, the system 200 can then apply a characterizing filter to the vector cube by rescoring the cell scores within the vector matrices included in the vector cube according to how well the motion represented by the cell scores aligns with the determined motion character, as described below.

Figure 6A:
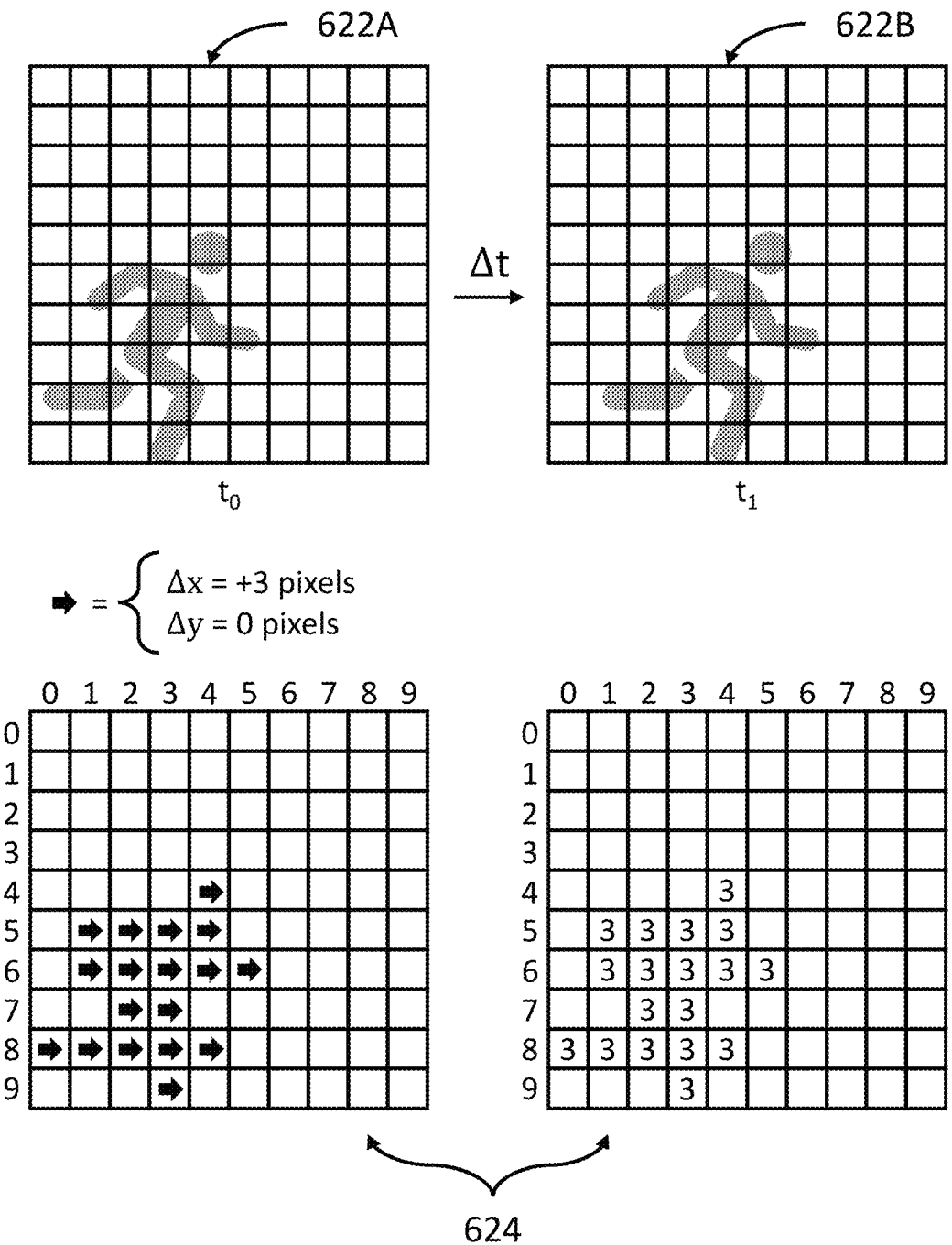
FIGS. 6A & 6B depict a process for applying a characterizing filter to a vector matrix.
Figure 6B:
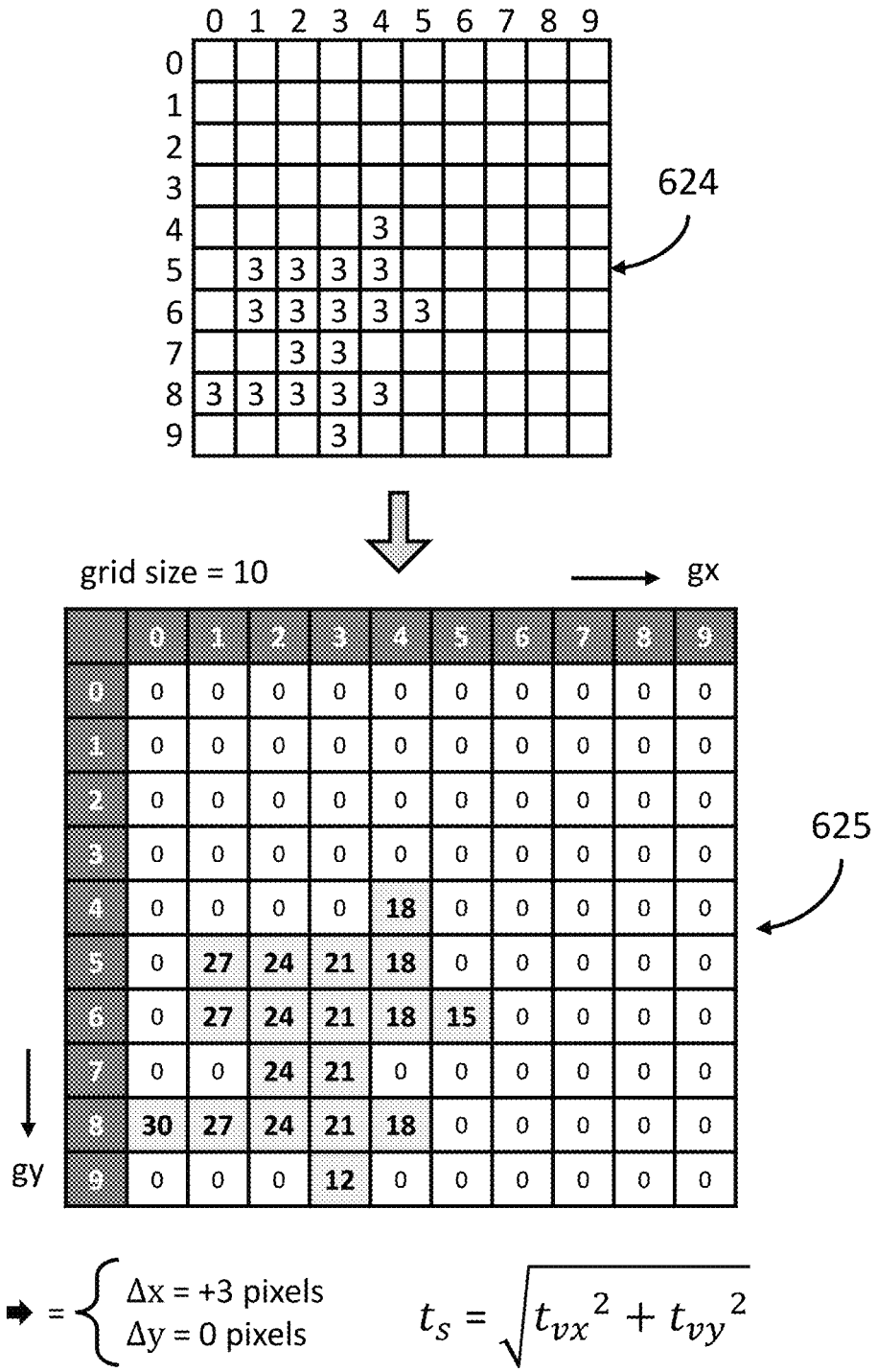

FIGS. 6A & 6B depict an exemplary process for applying a characterizing filter to a vector matrix. FIG. 6A illustrates the generation of a vector matrix representing the segment from time $t_0=0$ s to time $t_1=1$ s of the recording of the running man, as described above with respect to FIG. 3. A grid box has been overlayed atop the still image 622A and the subsequent still image 622B, and a motion vector has been calculated for each cell representing the motion captured by the video between times $t_0=0$ s and $t_1=1$ s. The resultant vector matrix 624 is shown below, wherein each black arrow represents a vector having a horizontal component of +3 pixels (i.e., 3 pixels to the right) and a vertical component of 0 pixels. In this example, as depicted by FIG. 6B, the system 200 applies a characterizing filter according to a convergence motion character by weighing convergent motion (i.e., motion in the direction of the center of the grid box) further away from the center of the grid box more positively than convergent motion closer to the center of the grid box, while divergent motion (i.e., motion in the direction away from the center of the grid box) is weighed negatively. For example, in the example depicted by FIG. 6B, a positive horizontal component of a motion vector in a cell is multiplied by the difference between the size of the grid box in the horizontal direction (in this example, 10) and the cell's horizontal position on the grid (i.e., gx). A negative horizontal component of the motion vector in a cell is simply multiplied by the cell's gx. For example, in the example depicted by FIG. 6B, although the absolute value of the horizontal convergent motion is the same in cell [0,8] as it is in cell [3,3], the character filtered value of the horizontal convergent motion in cell [0,8] ($t_{vx}(0,8)=+3*(10-0)=30$)) is greater than that of cell [3,8] ($t_{vx}(3,8)=+3*(10-3)=21$)). In this example, the system 200 has filtered every cell within vector matrix 624 with the same operation to generate character filtered vector matrix 625. Rescoring a vector matrix using a characterizing filter can essentially highlight areas of interest within an AV clip and make the system 200 more likely to focus on those areas of interest when performing CPZ and multiplexing operations (as described above and below, respectively). In some embodiments, the system 200 can apply a characterizing filter to a vector cube by applying the same transformation operation to each vector matrix included in the vector cube. However, the system 200 may apply a characterizing filter to a vector matrix or a vector cube in any other way.

Figure 7A:
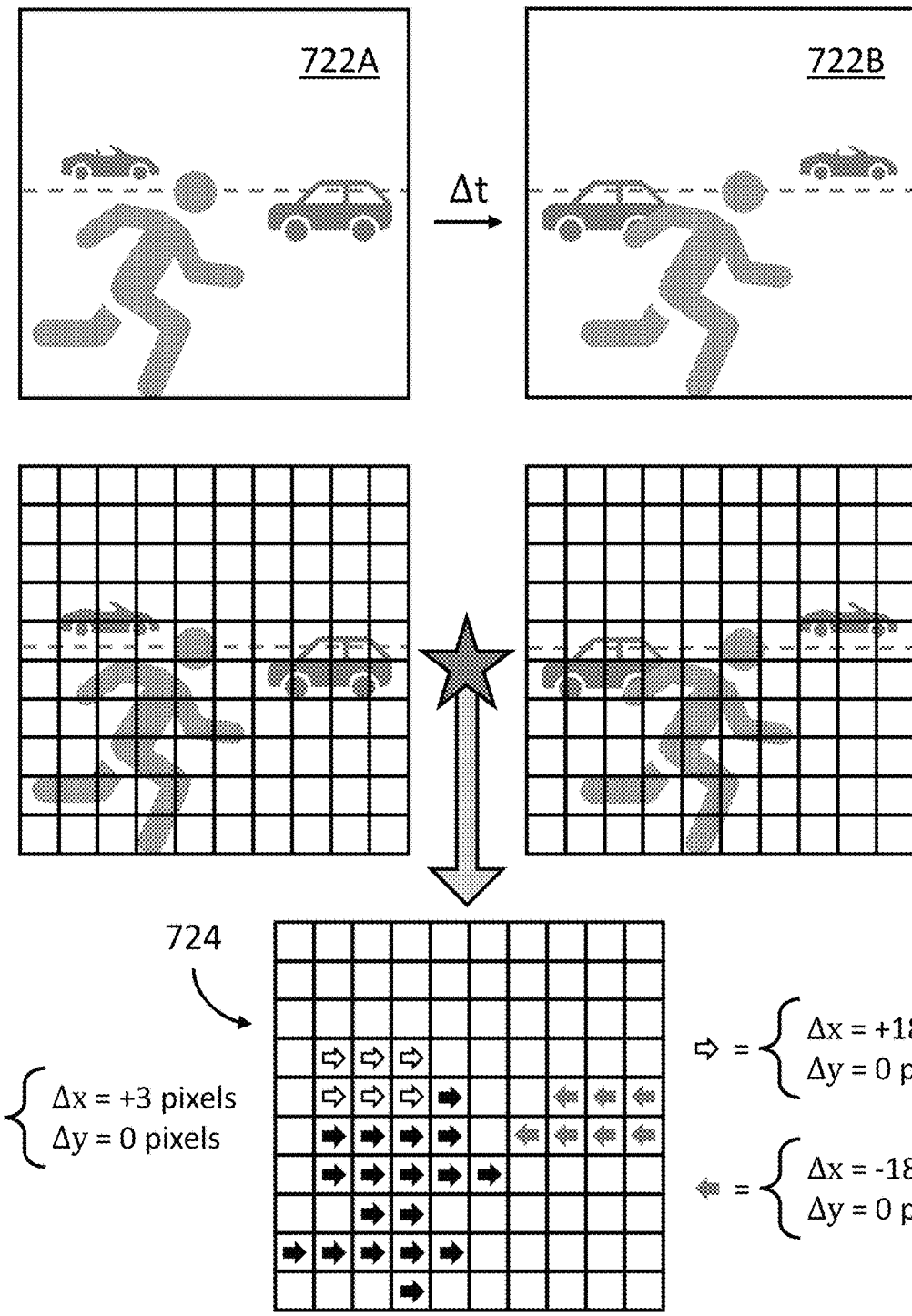
FIGS. 7A & 7B depict a process for applying a clustering filter to a vector matrix.
Figure 7B:

FIGS. 7A & 7B depict an exemplary process for applying a clustering vector cube filter (also referred to as a "clustering filter") to a vector cube. In general, a clustering filter rescores the cell scores within a vector matrix according to how likely the motion represented by the cell scores is to be part of a larger, contiguous body of motion. It is helpful here to consider a scene in which there are multiple bodies in motion, as illustrated by still images 722A and 722B in FIG. 7A. In this example, still images have been taken from a video in which a man is running along a street that can be seen behind him, and there are two cars driving along the street in opposite directions. As illustrated in FIG. 7, grid boxes are overlayed atop the two subsequent still images 722, and a motion vector has been calculated for each cell representing the motion captured by the video in the segment between the two still images 722. The resultant vector matrix 724 is shown below, wherein each black arrow represents a vector having a horizontal component of +3 pixels (i.e., 3 pixels to the right) and a vertical component of 0 pixels, each white arrow represents a vector having a horizontal component of +18 pixels and a vertical component of 0 pixels, and each grey arrow represents a vector having a horizontal component of −18 pixels (i.e., 18 pixels to the left) and a vertical component of 0 pixels.

In some embodiments, as depicted by FIG. 7B, the system 200 applies a clustering filter to a vector matrix by comparing the cell score of a particular cell to the non-zero cell scores of the cells neighboring the particular cell (e.g., the absolute vale of the cell scores). For each neighboring cell, the system 200 calculates a similarity score between the cell score of the particular cell and the cell score of the neighboring cell. In this example, the similarity score is calculated as the smaller cell score divided by the larger cell score, although a similarity score may be calculated in any other way. In this example, the cell score of the neighboring cell is then multiplied by the similarity score and added to a temporary sum. The same is done for each neighboring cell, and the cell score of the particular cell is rescored as the total temporary sum divided by the number of neighboring cells that contributed to the total temporary sum.

For example, in the example depicted by FIG. 7B, cell [3,8] originally possesses a cell score of 3, and is neighbored in each direction by neighboring cells all possessing equivalent cell scores of 3, naturally, because each of these cell represents a part of the running man moving in uniform motion, which is to say that these five cells represent motion that is part of a larger, contiguous body of motion (e.g., the running man). When the clustering filter is applied to cell [3,8], each cell neighboring contributes a score of (3/3)*3=3 to the temporary sum, for a total of 12. Cell [3,8] is then rescored by the temporary sum (12) divided by the number of contributing neighboring cells (4), which equals 3, which is to say that the cell score of cell [3,8] effectively remains the same. Now consider cell [2,4], which originally possesses a cell score of 18 (representing motion that is part of the car moving to the right), but is not uniformly neighbored. Three of cell [2,4]'s neighboring cells also possess original cell scores of 18 (they also represent motion that is part of the same car), but the fourth neighboring cell (cell [2,5]) possesses an original cell score of 3 (representing motion that is part of the running man). In this case, when the clustering filter is applied to cell [2,4], three neighboring cells contribute a score of (18/18)*18=18 to the temporary sum, but the fourth neighboring cell contributes a score of (3/18)*3=0.5 to the temporary sum, for a total temporary sum of 54.5. Cell [2,4] is then rescored by the temporary sum (54.5) divided by the number of contributing neighboring cells (4), which equals 13.625. Thus, while the cell score of cell [3,8] has gone effectively unchanged, the cell score of cell [2,4] has decreased, because it is relatively less likely to represent motion that is part of a larger, contiguous body of motion, due to the fact that one of its neighboring cells is not as uniform to those of cell [3,8]. In this example, the system 200 has filtered every cell within vector matrix 724 to generate cluster filtered vector matrix 725. Rescoring a vector matrix using a clustering filter can essentially highlight areas of interest within an AV clip and make the system 200 more likely to focus on those areas of interest when performing CPZ or multiplexing operations (as described above and below, respectively). In some embodiments, the system 200 can apply a clustering filter to a vector cube by applying the same transformation operation to each vector matrix included in the vector cube. However, the system 200 may apply a clustering filter to a vector matrix or a vector cube in any other way.

Figure 8:
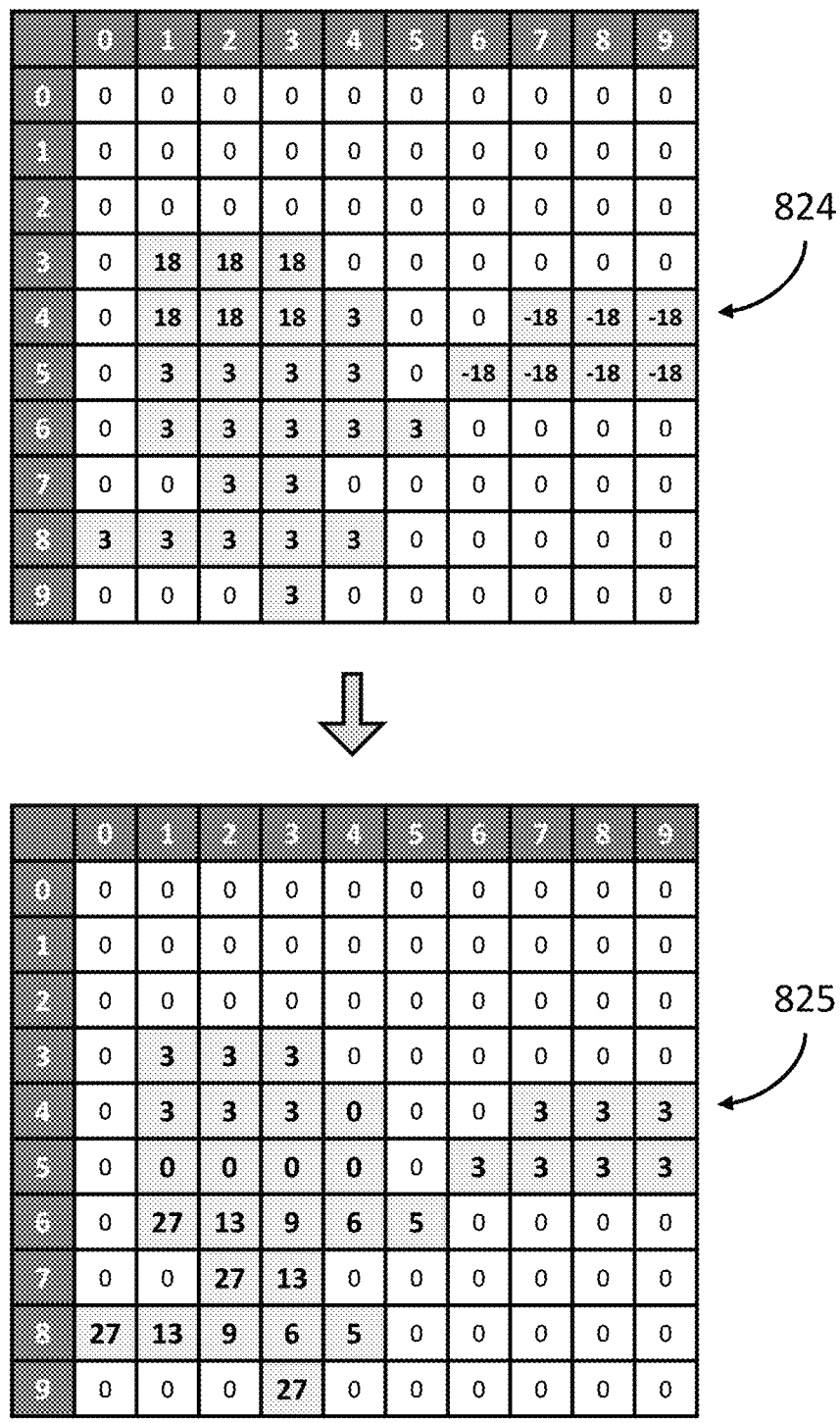
FIG. 8 depicts a process for applying a normalizing filter to a vector matrix.

FIG. 8 depicts an exemplary process for applying a normalizing vector cube filter (also referred to as a "normalizing filter") to a vector cube. In general, a normalizing filter rescores the cell scores within a vector matrix included in a vector cube according to average cell score values throughout the vector cube. In this way, the system 200 can attempt to dampen noisy areas of an AV clip and emphasize areas of interest within an AV clip. Consider again the scene described above with respect to FIGS. 7A & 7B, in which there is a man running along a street with cars driving on the street behind him. If the street remains busy with cars throughout the entire AV clip, the cells representing the street (e.g., the cells in rows 3-5) will have the highest cell scores throughout the AV clip. Thus, if the system 200 performed a CPZ or multiplexing operation (as described above and below, respectively) on a vector cube representing this scene, the system 200 would likely focus on the street with the cars driving along it. The running man, however, is the central figure in this scene, not the cars driving along the street.

In some embodiments, as depicted by FIG. 8, the system 200 applies a normalizing filter to a vector matrix included in a vector cube by first calculating an average of the cell scores (e.g., the absolute value of the cell scores) within a particular cell across each vector matrix included in the vector cube. For example, consider again cell [2,4], which possesses an original cell score of 18, representing the car moving to the right. In a subsequent vector matrix, cell [2,4] would presumably again possess an original cell score of 18, representing the car moving to the left, which has since moved from the right side of the frame to the left side of the frame, as illustrated by still image 722B in FIG. 7A. If the street remains this busy, cell [2,4] may possess an original cell score of 18 in each vector matrix included in the vector cube, which would give cell [2,4] an average cell score (also referred to as a "cell average") of 18. The system 200 then calculates the average cell score of every cell within every vector matrix included in the vector cube. Let us assume here that the sum of the cell scores in each vector matrix remains constant throughout this AV clip, which, as depicted by vector matrix 824 in FIG. 8, is equal to 288. Dividing that sum by the 100 cells within the grid box produces the average cell score of the entire vector cube (also referred to as a "cube average"; in this example, 2.8, which we will round to 3 for simplicity). In some embodiments, after calculating a cell average for a particular cell and calculating a cube average for the vector cube, the system 200 then generates a normalizing ratio (e.g., the cube average divided by the cell average) for the particular cell and multiplies the cell score in each instance of the particular cell across each vector matrix included in the vector cube by the normalizing ratio. In the case of cell [2,4], every cell score within each instance of cell [2,4] across each vector matrix included in the vector cube will be multiplied by (3/18). Thus, in the normalized vector matrix 825, the new cell score of cell [2,4] is 3. The cell score has been decreased to account for the cell's high average level of activity.

However, consider again cell [3,8]. Assume the AV clip is nine seconds long, and that the running man continues running at a constant rate (e.g., 3 pixels to the right). For the first four out of the nine total segments that would be produced by the AV clip, cell [3,8] would possess an original cell score of 3. Assuming the cell score of cell [3,8] is zero for the other five segments, the cell average for cell [3,8] would be (4*3/9=12/9). Already knowing that the cube average is 3, the normalizing ratio for cell [3,8] would then be (3/(12/9)=9/4). In this example, the system 200 would multiply every cell score within each instance of cell [3,8] across each vector matrix included in the vector cube by (9/4). Thus, in the normalized vector matrix 825, the new cell score of cell [3,8] is 6.75, which is more than double that of its original cell score. As depicted in normalized vector matrix 825, the application of the normalizing filter has dampened the cell scores representing the noisy street and emphasized the cell scores representing the running man, which will make it easier for the system 200 to focus on the running man when performing a CPZ or multiplexing operation (as described above and below, respectively).

Multiplexing

As mentioned above, in some embodiments, the system 200 is configured to generate an optimized AV file from an original AV file. In some embodiments, the system 200 begins by generating a vector cube for the original AV file, as described above. In some embodiments, after generating a vector cube for the original AV file, the system 200 uses the vector cube generated for the original AV file to identify multiple discrete scenes within the original AV file (also referred to as "multiplexing"), such as by using the crop, pan, zoom module 260, as described below.

FIGS. 9A & 9B illustrate an exemplary process for multiplexing within an original AV file. Still image 922 is taken from an original AV file including a recording of a street parade and contains multiple different clusters of motion. In this example, the system 200 has already overlaid a grid box 927 atop still image 922, done the same for the subsequent still image (not shown), and generated a vector matrix (not shown) representing the motion captured by the recording during the segment between the two consecutive stills (as described above). In some embodiments, similar to the CPZ operation, the system 200 begins the multiplexing operation by determining the aspect ratio of the grid box 927 (in this example, 2:1) and the original frame size (as described above; in this example, 20×10). Then, in some embodiments, the system 200 identifies every possible subframe having a subframe size equal to a predetermined or user defined percentage of the original frame size (also referred to as a "max zoom"). For example, in the example illustrated by FIG. 9A, the system 200 has identified possible subframes 928 having a subframe size of (approximately) 10% of the original frame size (representing a max zoom of approximately 10×). In some embodiments, after identifying all of the possible subframes 928, the system 200 identifies the possible subframe 928 having the highest subframe score (also referred to as an "anchor subframe"). In some embodiments, the system 200 then identifies the possible subframe 928 having the next highest subframe score (also referred to as a "secondary subframe"), and continues identifying secondary subframes until the system 200 has identified x total multiplex subframes (e.g., 1 anchor subframe and x−1 secondary subframes), wherein x is a predetermined or user defined maximum number of multiplex subframes.

For example, in the example illustrated in FIGS. 9A & 9B, the system 200 has identified possible subframes 928 including possible subframes 928A-928E. In this example, a user has selected 3 as the maximum number of multiplex subframes 929, and the system 200 has identified possible subframe 928E as the anchor subframe 929E and possible subframes 928B and 928A as secondary subframes 929B and 929A, respectively. The system 200 can then use the anchor subframe and secondary subframes when generating an optimized AV file from the original AV file, similarly to the process described above with respect to the CPZ operation. In some embodiments, when selecting between multiplex subframes identified by the multiplexing operation, the system 200 selects subframes in a round robin or randomized sequence. In some embodiments, when selecting between multiplex subframes identified by the multiplexing operation, the system 200 alternates between anchor subframes and secondary subframes (e.g., the system 200 will not select consecutive secondary subframes nor consecutive anchor subframes). However, the system 200 may select between multiplex subframes in any other way.

In some embodiments, the system 200 identifies a possible subframe 928 as a multiplex subframe 929 only if the possible subframe has a subframe score greater than or equal to a predetermined or user defined percentage of the vector matrix score (e.g., the total sum of the cell scores within the vector matrix). The predetermined or user defined percentage of the vector matrix score may be referred to as a multiplexing factor (MF). In some embodiments, when the system 200 identifies a secondary subframe, if the secondary subframe overlaps an anchor subframe or a preceding secondary subframe, the system 200 multiples the subframe score of the secondary subframe by (1—the percentage of overlapping cells) for each of the anchor frame or preceding secondary subframes that the secondary subframe overlaps, and keeps the secondary subframe as a multiplex subframe 929 only if the new subframe score of the secondary subframe is greater than or equal to the vector matrix score multiplied by the MF. However, the system 200 may identify multiplex subframes in any other way.

Parallel Audio-Visual (AV) Files

Figure 10:
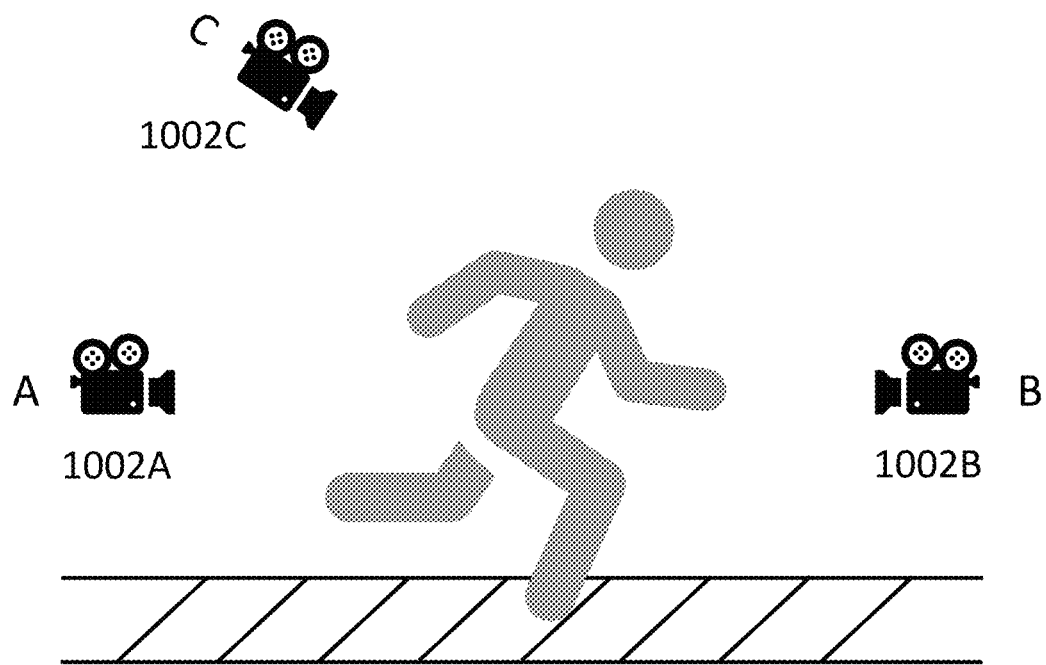
FIG. 10 illustrates an exemplary recording of parallel audio-visual files.

As mentioned above, disclosed herein are systems and methods for autonomously synchronizing and optimizing a plurality of parallel audio-visual (AV) files to generate an optimized AV file from the plurality of parallel AV files. The term "parallel AV files," as used herein, refers to two or more AV recordings of the same action. For example, FIG. 10 illustrates an exemplary recording of parallel AV files. In the example illustrated in FIG. 10, the action being recorded is that of a man running on a sidewalk. In this example, the action is being recorded by three distinct and individual video sources 1002 (e.g., video cameras): Camera A 102A (hereinafter, "Cam A"), Camera B 1002B (hereinafter, "Cam B"), and Camera C 1002C (hereinafter, "Cam C"). The three video cameras will thus produce three different but parallel AV files, one parallel AV file from each of Cam A, Cam B, and Cam C, respectively.

As illustrated in FIG. 10, different cameras recording the same action can and most likely will record the action from different perspectives. In this example, Cam A appears to be recording the man running on the sidewalk (i.e., the action) from behind the man, while Cam B appears to be recording the action from in front of the man. When recording action with the intention of producing a video for consumers, a film crew will often record the action with multiple video cameras positioned to record the action from different perspectives, thus producing multiple parallel AV files, as described above. Then, after the action is recorded, a post-production crew will process the parallel AV files, selecting the best shots from the best angles and compiling them all together into a single video file that is ready for viewing by the end consumer. However, as described above, this post-production process is generally and largely manual and often takes even trained professionals many hours.

Figure 11:
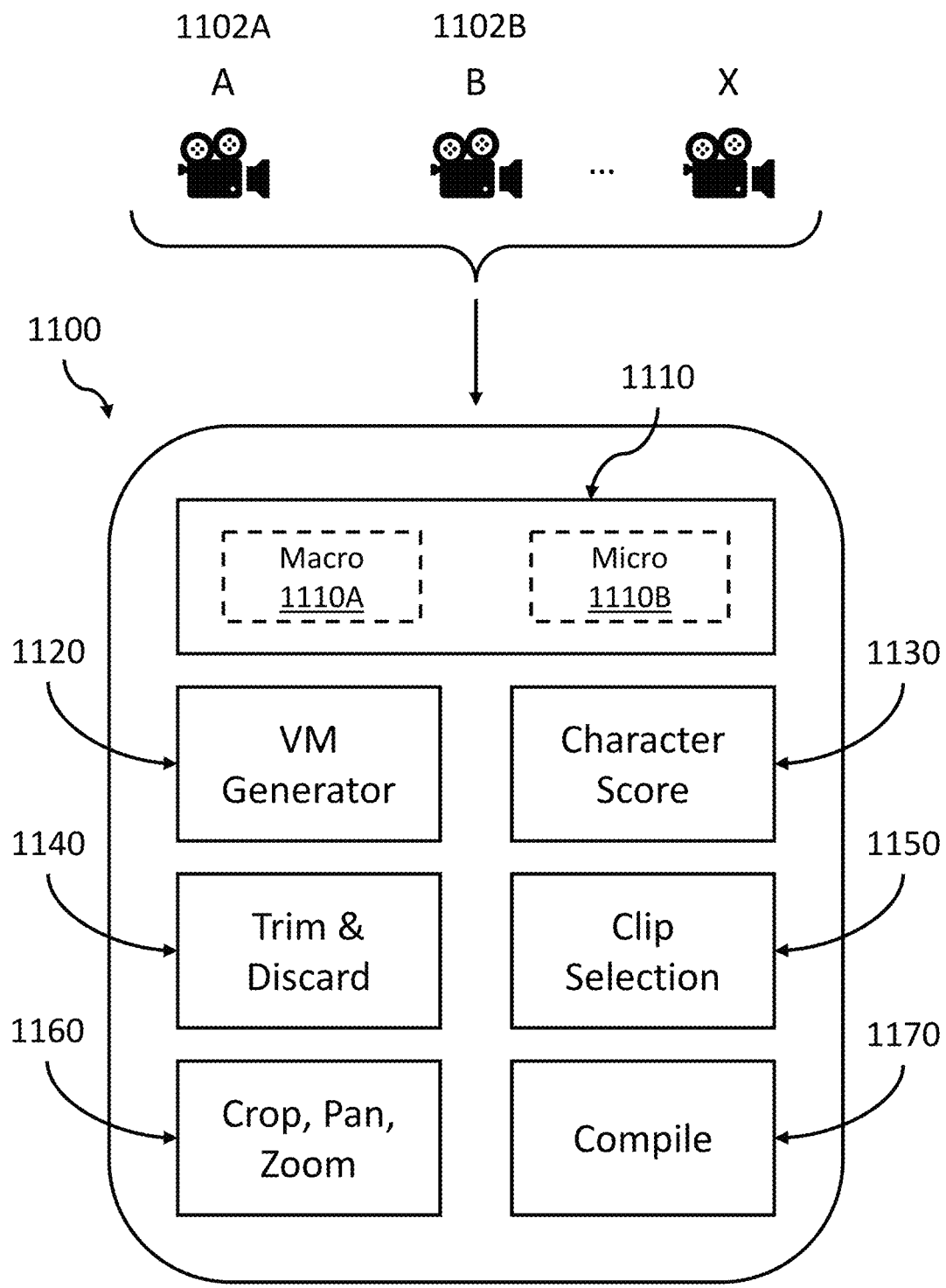
FIG. 11 depicts a diagram of a system for autonomously generating an optimized audio-visual file from two or more parallel audio-visual files.

FIG. 11 depicts a diagram of a system 1100 for automated synchronization and optimization of a plurality of parallel audio-visual files. In some embodiments, the system 1100 includes one or more modules (e.g., software modules), such as a synchronization module 1110, a vector matrix module 1120, a characterization module 1130, a trim & discard module 1140, a clip selection module 1150, a crop, pan, zoom (CPZ) module 1160, and a compiling module 1170. In some embodiments, the synchronization module 1110 further includes a macro synchronization module 1110A and a micro synchronization module 1110B. In general, the modules of the system 1100 function cooperatively to receive a first series of audio-visual (AV) clips associated with a first video source (e.g., 1102A) and a second series of AV clips associated with a second video source (e.g., 1102B); synchronize the first and second series of AV clips to create a synchronized table of AV clips using one or more wave form maximization processes; generate a set of vector cubes comprising a unique vector cube for each clip of the first series of AV clips and each clip of the second series of AV clips; characterize the set of vector cubes; and, using the synchronized table of AV clips and the characterized set of vector cubes, compile the first and second series of AV clips into a new video file comprising a sequence of AV segments selected from the first and second series of AV clips. The various functions of the system 1100 and the modules included therein are describe in further detail below.

Figure 12A:
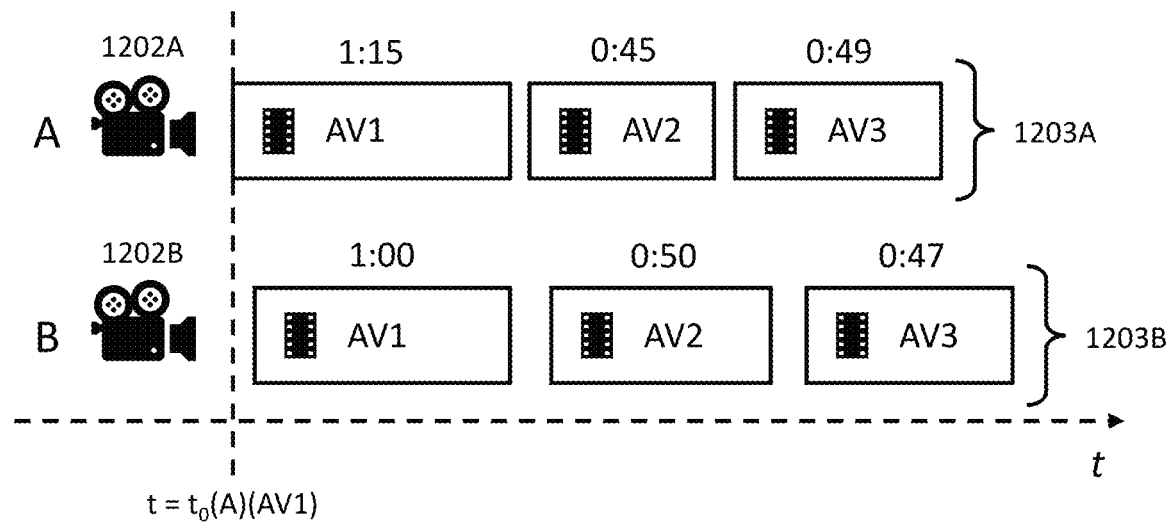
FIGS. 12A & 12B depict exemplary parallel audio-visual files.
Figure 12B:
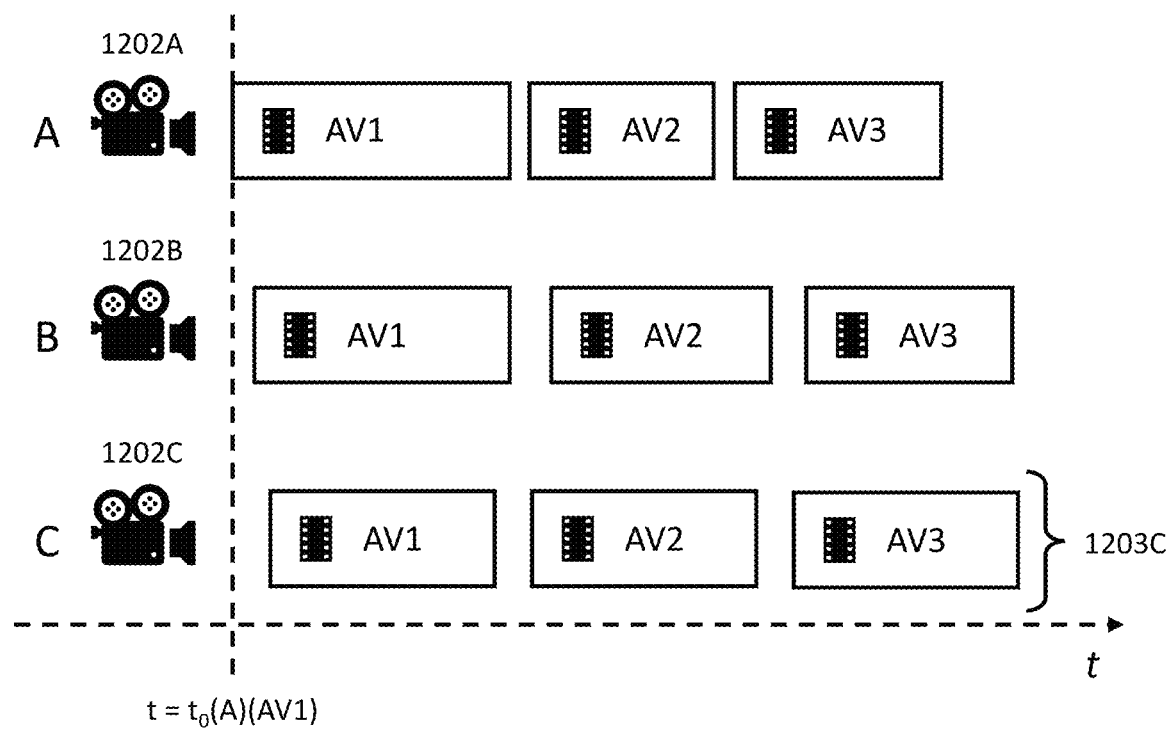

FIGS. 12A & 12B depict exemplary parallel audio-visual (AV) files. In some embodiments, the system 1100 (as depicted in FIG. 11) is configured to receive multiple parallel AV files from multiple distinct video sources 1202. A single AV file (e.g., AV file 1203A) may include multiple AV clips (hereinafter, a "series of AV clips"). For example, as depicted in FIG. 12A, AV file 1203A, recorded on video source 1202A, includes three AV clips: AV1, AV2, and AV3 (hereinafter, "(A)(AV1)," "(A)(AV2)," and "(A)(AV3)," respectively). AV file 1203B, recorded on video source 1202B, also includes three video clips: AV1, AV2, and AV3 (hereinafter, "(B)(AV1)," "(B)(AV2)," and "(B)(AV3)," respectively). Each clip has a timestamp that records the day and time that the clip was recorded and a clip length (i.e., the duration of the clip, represented herein in seconds). As mentioned above, in some embodiments, a method for autonomously synchronizing and optimizing a plurality of parallel AV files begins with receiving two or more series of AV clips. In the example depicted by FIG. 12A, AV file 1203A (including the series of clips {(A)(AV1); (A)(AV2); (A)(AV3)}) and parallel AV file 1203B (including the series of clips {(B)(AV1); (B)(AV2); (B)(AV3)}) may be uploaded into the system 1100. FIG. 12B depicts an example of a set of three parallel AV files that may be uploaded into the system 1100.

AV file 1203A and AV file 1203B are parallel AV files (i.e., the two AV files are recordings of the same action)—for example, both AV file 1203A and AV file 1203B are recordings of the man running on the sidewalk illustrated in FIG. 10—but, as depicted in FIG. 12A, the clips included in the two parallel AV files may be of different lengths and have different timestamps. In the example depicted by FIG. 12A, clip (A)(AV1) presumably corresponds to clip (B)(AV1); however, (A)(AV1) is 75 seconds long while (B)(AV1) is 60 seconds long, and the timestamp of (A)(AV1) (i.e., the beginning of clip (A)(AV1); time t=$t_0$(A)(AV1)), is not the same as the timestamp of (B)(AV1) (e.g., time t=$t_0$(B)(AV1)). This happens often in the real world. For example, Cam B may have simply started recording the action a few seconds after Cam A. Or, for example, Cam B records timestamps as the day and time that an AV clip is written to the storage drive housed within Cam B, and Cam B may have simply taken longer to write the recorded video to its storage drive than Cam A. Thus, in order to accurately optimize and compile a plurality of AV clips from a plurality of parallel AV files into a single, seamless video file, the plurality of AV clips must first be synchronized such that the same action occurs at precisely the same time across every parallel AV file.

Synchronization of Parallel AV Files

In some embodiments, after receiving two or more series of AV clips, the system 1100 then synchronizes the AV clips. As mentioned above, before a plurality of AV clips from a plurality of parallel AV files can be accurately optimized and compiled into a single, seamless video file, the plurality of AV clips must first be synchronized such that the same action occurs at precisely the same time across every parallel AV file. Various methods and processes for synchronizing AV clips from parallel AV files are contemplated herein. In some embodiments, various methods and processes for synchronizing AV clips from parallel AV files begin by extracting the audio components (e.g., the audio waveform; hereinafter, "waveform") of the AV clips and performing a waveform maximation function.

Figure 13:
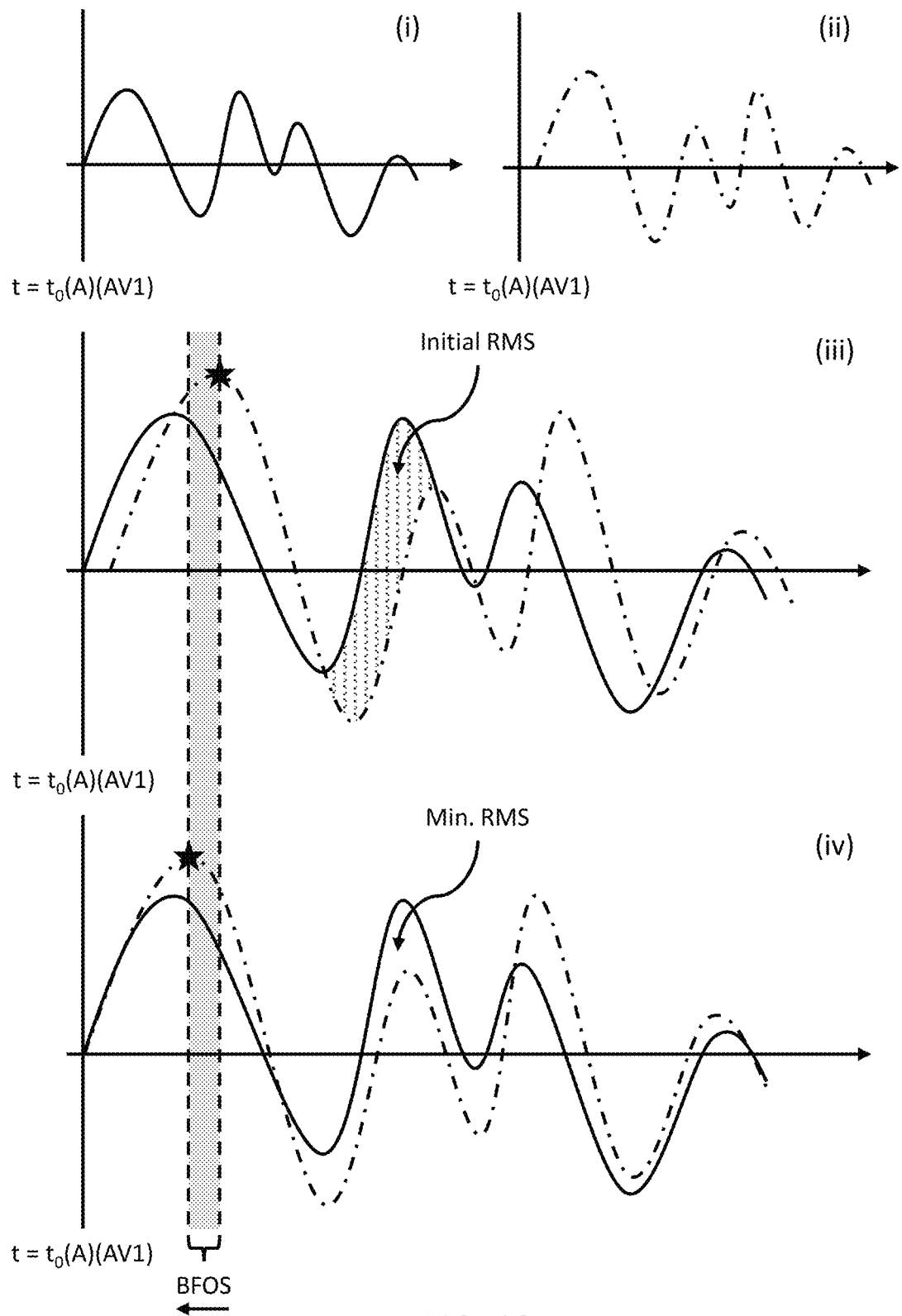
FIG. 13 illustrates an exemplary waveform maximization process.

FIG. 13 depicts an exemplary waveform maximization process. Using waveform maximization, two different waveforms (e.g., waveforms of AV clips from parallel AV files) can be compared to determine a timestamp offset that best synchronizes the two waveforms (hereinafter, "best fit offset" (BFOS)). For example, in the example depicted by FIG. 13, graph (i) depicts the audio waveform extracted from clip (A)(AV1) (as depicted in FIG. 12A) and graph (ii) depicts the audio waveform extracted from clip (B)(AV1). The waveforms are similar, which can be expected, because the parallel AV files are recordings of the same action (e.g., the man running on the sidewalk illustrated in FIG. 10). The waveforms are also different, which can also be expected, because the parallel AV files are different recordings recorded on different video sources and are thus in two different audio fields, however slight. In this example, we also know that the two different video sources (Cam A and Cam B) are set up in different positions to record the action from different perspectives—Cam A is set up to record the running man from behind, and Cam B is set up to record the running man from in front. Thus, we would expect the waveforms extracted from (A)(AV1) and (B)(AV1) to be similar but certainly not identical. Furthermore, as depicted in FIG. 13, the waveform extracted from (B)(AV1) (shown in graph (ii)) begins at a slightly later timestamp than that of the waveform extracted from (A)(AV1), which mirrors the difference in timestamp between the two clips depicted in FIG. 12A.

The waveform maximization function begins by performing a delta root mean square ($\Delta$RMS) operation on the two waveforms, wherein a root mean square (RMS) operation is performed on each of the two waveforms and then a difference between the values returned by the two RMS operations is calculated. This difference is referred to as a $\Delta$RMS (and, in the case of the difference between the initial two RMS operations, "$\Delta RMS_{initial}$"). The ARMS is illustrated in FIG. 13 as the total sum of the area enclosed between the two waveforms. One such area is marked with dotted lines in graph (iii). The waveform maximization function then continues by incrementally translating (e.g., by 100 milliseconds) the second waveform relative to the first (e.g., (B)(AV1) relative to (A)(AV1)) across a predefined range (e.g., +/−5 seconds) and performing a $\Delta$RMS operation at each increment. Once finished performing the $\Delta$RMS operation at each increment across the predefined range, the waveform maximization function determines which position across the predefined range yielded the lowest $\Delta$RMS value, $\Delta RMS_{min}$. Finally, the waveform maximization function then determines the translation value that yielded the $\Delta RMS_{min}$ and outputs the translation value as the best fit offset (BFOS). For example, if the $\Delta$RMS between the waveforms extracted from (A)(AV1) and (B)(AV1) is minimized when the waveform of (B)(AV1) is translated by −3 seconds, the BFOS returned by the waveform maximization function is −3 seconds. The BFOS is represented in FIG. 13 by the difference in the position between the peak of the first local maximum of the (B)(AV1) waveform (the black star) at $\Delta RMS_{initial}$ and at $\Delta RMS_{min}$.

As mentioned above, various methods and processes for synchronizing AV clips from parallel AV files are contemplated herein. In some embodiments of the system 1100, the synchronization of AV clips from parallel AV files is performed by the synchronization module 1110. In some embodiments, the synchronization of AV clips from parallel AV files is performed in two steps, macro synchronization and micro synchronization, by a macro synchronization module 1110A and a micro synchronization module 1110B, respectively.

Figure 14A:
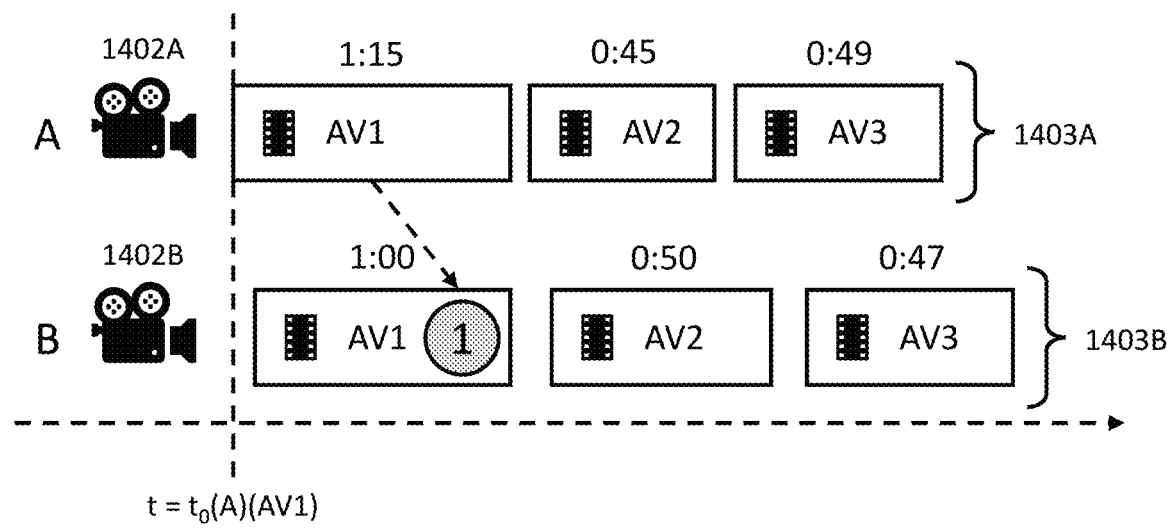
FIG. 14A depicts a first synchronization matching scheme.
Figure 14B:
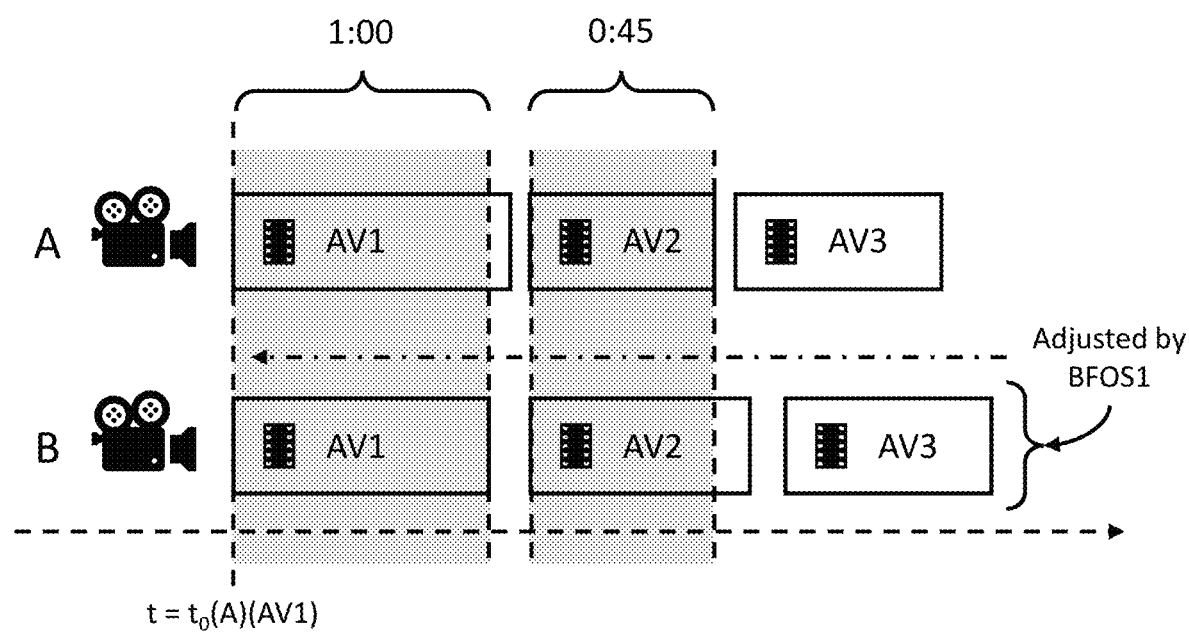
FIG. 14B depicts an adjusted series of audio-visual clips.

In some embodiments of the system 1100, macro synchronization of AV clips from parallel AV files is performed using a Cascade synchronization process. FIGS. 14A and 14B depict the Cascade synchronization process. Using the Cascade synchronization process, the system 1100 begins the synchronization process by extracting the waveforms of the AV clips from two different parallel AV files (e.g., AV file 1403A and AV file 1403B). Then, the system 1100 performs a first test (Test 1) by selecting the longest AV clip from the first AV file (the base AV file) and the longest clip from the second AV file (the sliding AV file) and performing the waveform maximization function (as described above) on the two AV clips. The base AV file remains constant in all macro synchronization processes. In the example depicted by FIG. 14A, the longest AV clip from AV file 1403A (received from video source 1402A, Cam A) is clip (A)(AV1). The longest AV clip from AV file 1403B (received from video source 1402B, Cam B) is clip (B)(AV1). In this case, the waveform maximization function here is exactly the same operation described above with respect to FIG. 13, and the value returned is a BFOS for Test 1, BFOS1.

After calculating a BFOS1 for Test 1 (i.e., the BFOS between the longest clip of the base AV file (e.g., AV file 1403A) and the longest clip from the sliding AV file (e.g., AV file 1403B)), the system 1100 then adjusts the AV clips included in the sliding AV file by applying BFOS1 to the timestamps of each of the AV clips included in the sliding AV file. The adjusted AV clips of the sliding AV file are depicted in FIG. 14B. For example, if the BFOS1 calculated by the waveform maximization function between (A)(AV1) and (B)(AV1) is −3 seconds, the system 1100 adjusts the timestamp of every AV clip included in AV file 1403B (e.g., (B)(AV1), (B)(AV2), and (B)(AV3)) by −3 seconds. Then, the timestamp of each AV clip from the base AV file (e.g., AV file 1403A) is compared to the timestamp of each AV clip from the sliding AV file (e.g., AV file 1403B). If any two compared timestamps are within a threshold time difference (e.g., within 1 second), the total amount of time that the durations of the two corresponding AV clips overlap is summed. For example, as depicted in FIG. 14B, after the AV clips of the sliding AV file have been adjusted by the BFOS1, the timestamp of AV clips (A)(AV1) and (B)(AV1) now line up within 1 second of each other, as do the timestamps of clips (A)(AV2) and (B)(AV2). In this example, as depicted in FIG. 14B, the duration of (A)(AV1) and the duration of (B)(AV1) overlap for the duration of (B)(AV1), which is 60 seconds. The duration of (A)(AV2) and the duration of (B)(AV2) overlap for the duration of (A)(AV2), which is 45 seconds. Thus, the sum total amount of overlap for Test 1 is 60 seconds+40 seconds=105 seconds. This sum total is referred to as a wave fit score (WFS), and, in this specific example, the WFS of Test1, WFS1 (the final output value of Test 1). Thus, for Test 1, two output values have been produced, a BFOS (BFOS1) and a WFS (WFS1). In some embodiments, as part of the Cascade synchronization process, the system 1100 will also record the number of clips (hereinafter, "#CLIPS") that contributed to the WFS for a test, which, in this example, would be 2 clips for Test 1.

After completing the first test (e.g., Test 1), if no short circuit criteria has been met, the Cascade synchronization process continues by performing a second test (Test 2) by selecting the longest clip from the base AV file and the next longest clip of the sliding AV file (e.g., the second longest clip of AV file 1403B, (B)(AV2)) and performing the waveform maximization function on the two AV clips. For Test 2, a second BFOS (e.g., BFOS2) and a second WFS (e.g., WFS2) will be produced. Then, if any short circuit criteria have still not been met, the process will continue by performing a third test comparing the longest clip from the base AV file to the next longest clip of the sliding AV file (e.g., the third longest clip of AV file 1403B, (B)(AV3)) and performing the waveform maximization function on those two AV clips, producing a third BFOS and a third WFS. Once a test has been performed between the longest clip of the base AV file and each of the clips of the sliding AV file, the system 1100 will begin performing tests between the second longest clip of the base AV file and each of the clips of the sliding AV file (in sequence of longest to shortest), and so on and so forth, until A) every permutation of clip pairs between the two parallel AV files has been tested or B) a short circuit criteria has been met.

Figures 16A, 16B:
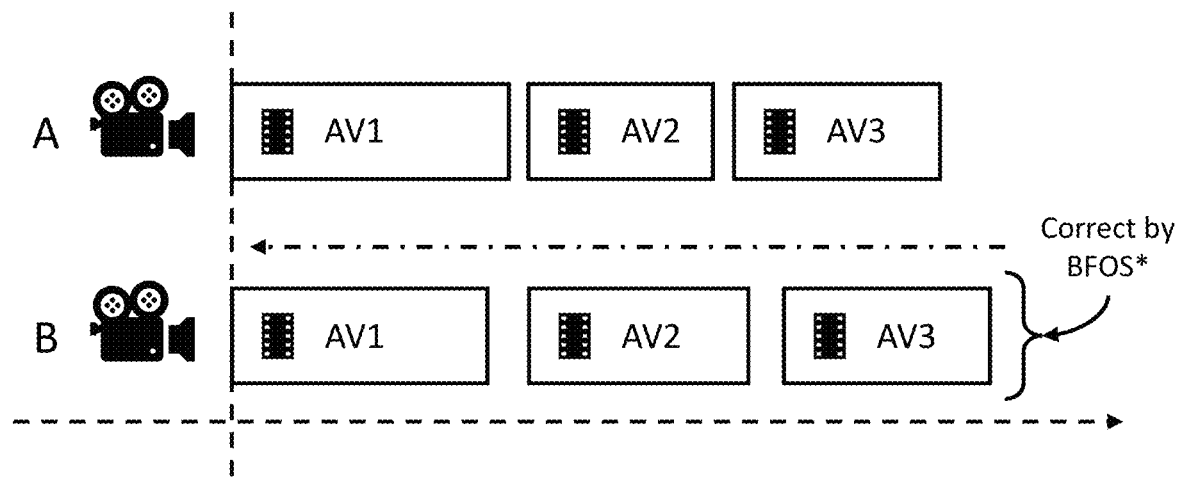
FIG. 16A depicts a macro synchronized series of audio-visual clips.
FIG. 16B depicts a macro synchronized table of audio-visual clips.

Ultimately, through the testing of various pairs of AV clips between the two parallel AV files, the Cascade synchronization process produces a data table of tests and their corresponding BFOS and WFS values (and, in some embodiments, their corresponding #CLIPS, as described above). Then, once the process is finished (either by exhausting the permutations of clip pairs or meeting a short circuit criteria, as mentioned above), the system 1100 identifies the test with the highest WFS value (or the test that satisfied the short circuit criteria) and outputs the BFOS associated with that test as the max wave fit BFOS (hereinafter, BFOS*). The BFOS* is then applied to the timestamps of each of the AV clips of the sliding AV file to produce a macro synchronized table of AV clips, as depicted in FIG. 16B and described below, the final output of the Cascade synchronization process.

As mentioned above, the Cascade synchronization process continues testing pairs of AV clips between the two parallel AV files being synchronized until A) every permutation of clip pairs between the two parallel AV files has been tested or B) a short circuit criteria has been met. In some embodiments of the system 1100, pursuant to speed and efficiency, a macro synchronization process may be short circuited (i.e., stopped before the test has run to completion) if one or more short circuit criteria has been met. When a short circuit criteria has been met, the system 1100 has identified a max wave fit BFOS (BFOS*) that satisfies a predetermined or user-defined level of probable accuracy. For example, in some embodiments, in the case of the Cascade synchronization process, a user of the system 1100 can enter a threshold number of clips ("#CLIPS") that contributed to the WFS of a test as a short circuit criteria. A user setting 3 clips as a threshold #CLIPS then, for example, would mean that if a BFOS of a particular test, when applied to the AV clips of the sliding AV file, yielded three or more pairs of clips between the two parallel AV files with matching timestamps, the test would end immediately and use the BFOS as the BFOS*. Essentially, setting a short circuit criteria allows the system 1100 to assume that a BFOS of a particular test performed by a macro synchronization process is the most accurate possible BFOS or at least accurate enough to end the macro synchronization process and proceed to a micro synchronization process, thereby avoiding a potentially significant amount of processing time.

Figure 15A:
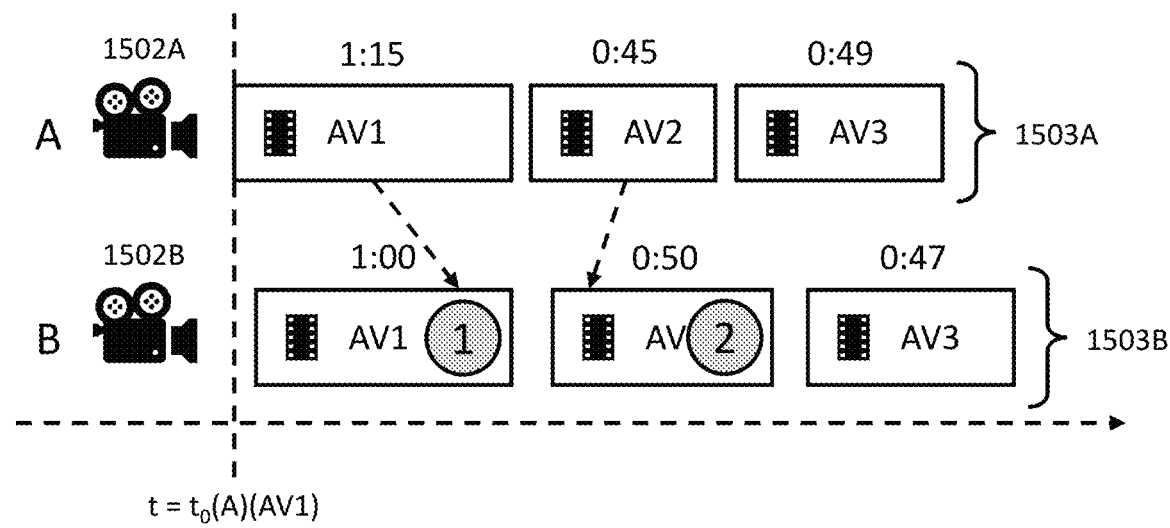
FIG. 15A depicts a second synchronization matching scheme.
Figure 15B:
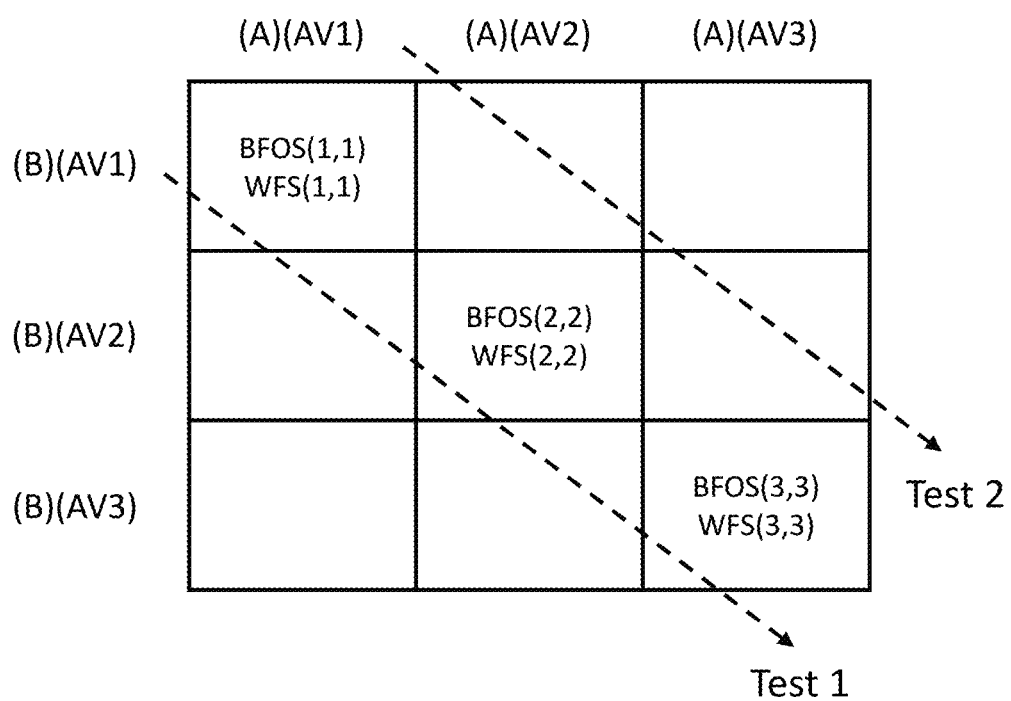
FIG. 15B depicts an exemplary table of outputs from a synchronization matching scheme.

In some embodiments of the system 1100, macro synchronization of AV clips from parallel AV files is performed using a Genetic synchronization process. FIGS. 15A and 15B depict the Genetic synchronization process. Using the Genetic synchronization process, the system 1100 begins the synchronization process by extracting the waveforms of the AV clips from two different parallel AV files (e.g., AV file 1503A and AV file 1503B). Then, the system 1100 performs a first test (Test 1) by selecting the first AV clip in the series of AV clips from the first AV file (the base AV file) and the first AV clip of the series of AV clips from the second AV file (the sliding AV file) and performing the waveform maximization function (as described above) on the two AV clips to produce a first BFOS between the first AV clip from the first AV file and the first AV clip from the second AV file (e.g., a BFOS between (A)(AV1) and (B)(AV1); BFOS(1,1)). As depicted in FIG. 15A, the first AV clip in the series of AV clips from the base AV file (AV file 1503A, received from video source 1502A, Cam A) is clip (A)(AV1). The first AV clip in the series of AV clips from the sliding AV file (AV file 1503B, received from video source 1502B, Cam B) is clip (B)(AV1). In this case, the waveform maximization function here is exactly the same operation described above with respect to FIG. 13.

Then, after determining a first BFOS between the first AV clip from the base AV file and the first AV clip from the sliding AV file, BFOS(1,1), the system 1100 then adjusts the first clip from the sliding AV file by the first BFOS (e.g., BFOS(1,1)) and calculates a first WFS between the first clip from the base AV file and the first clip from the sliding AV file, WFS(1,1) (i.e., the amount of time overlapping between the two clips). Then, if no short circuit criteria are met, the Genetic synchronization process continues Test 1 by performing a second waveform maximization function between the second AV clip in the series of AV clips from the base AV file and the second AV clip of the series of AV clips from the sliding AV file, thereby producing a second BFOS (BFOS (2,2)). Then the second BFOS (e.g., BFOS(2,2) is compared to the first BFOS (e.g., BFOS(1,1)). If the second BFOS is effectively different than the first BFOS (e.g., if the absolute value of the difference between the two BFOSs is greater than a predetermined threshold (e.g., 1 second)), the system 1100 concludes the first test. If the second BFOS is effectively the same as the first BFOS (e.g., if the absolute value of the difference between the two BFOSs is less than a predetermined threshold (e.g., 1 second)), the first test continues. The second BFOS (BFOS(2,2)) is applied to the second clip from the sliding AV file and a second WFS (WFS(2,2)) is calculated for the second clip from the base AV file and the second clip from the sliding AV file. If still no short circuit criteria are met, the Genetic test continues Test 1 by performing a third waveform maximization function using the third AV clip in the series of AV clips from the base AV file and the third AV clip in the series of AV clips from the sliding AV file, and so on and so forth, using the diagonal motion depicted in FIG. 15B, until A) there are no more pairs of clips to be compared along the selected diagonal or B) a short circuit criteria has been met.

Once Test 1 has concluded, the WFSs of Test 1 (e.g., WFS(1,1), WFS(2,2), and WFS(3,3)) are summed to produce a WFS1 for Test 1 and the number of clips from the sliding AV file contributing to the WFS1 (e.g., 3 clips) is recorded as a #CLIPS1 for Test 1. Thus, the output of the first test is a BFOS1, a WFS1, and a #CLIPS1. Then, if no short circuit criteria have been met, the system 1100 performs a second test (Test 2) by selecting another diagonal (as depicted in FIG. 15B) and producing a BFOS2, WFS2, and #CLIPS2 for Test 2. The system 1100 continues performing additional test by selecting unique diagonals until A) there are no more unique diagonals to test or B) a short circuit criteria has been met. Then, once the process is finished, the system 1100 identifies the test with the highest WFS value (or the test that satisfied the short circuit criteria) and outputs the BFOS associated with that test as the max wave fit BFOS (hereinafter, BFOS*). The BFOS* is then applied to the timestamps of each of the AV clips of the sliding AV file to produce a macro synchronized table of AV clips, as depicted in FIG. 16B and described below, the final output of the Genetic synchronization process.

In some embodiments, in the Genetic synchronization process, a user can set short circuit criteria using either or both of a threshold of #CLIPS (as described above with respect to the Cascade synchronization process) and a threshold number of valid guesses (hereinafter, "#GUESS"). In some embodiments, the system 1100 records a test performed during the Genetic synchronization process as a valid guess if the test produces a WFS greater than zero with a #CLIPS greater than or equal to a predetermined or user defined threshold number of clips (hereinafter, "#CLIPS$_{Guess}$"; distinct from #CLIPS) that contributed to the WFS. If a Genetic synchronization process is short circuited by a #GUESS short circuit criteria, the system 1100 identifies the test with the highest WFS value and outputs the BFOS associated with that test as the BFOS*.

In some embodiments, as mentioned above, the final output of a macro synchronization process is a macro synchronized table of AV clips. FIGS. 16A and 16B depict a macro synchronized set of parallel AV files and a macro synchronized table of AV clips, respectively. As described above, in some embodiments, the system 1100 synchronizes a set of parallel AV files using a two-step process, macro synchronization and micro synchronization. Using a macro synchronization process, such as one of the Cascade, Genetic, or Slide synchronization processes described above, the system determines a max wave fit BFOS (BFOS*) between a base AV file and a sliding AV file. The system 1100 then applies the BFOS* to every AV clip in the series of AV clips from the sliding AV file. FIG. 16A depicts a graphical visualization of a BFOS* applied to every AV clip in a series of AV clips from a sliding AV file (e.g., the AV clips included in the series of AV clips from Cam B). FIG. 16B depicts a corresponding macro synchronized table of AV clips (also referred to as a "first correction table" or "CT1"). As shown in FIG. 16B, the macro synchronized table of AV clips is a table of key value pairs, wherein each key is an identifier of a particular AV clip and each value is a timestamp. The macro synchronized table of AV clips begins with the key value pairs representing each AV clip in the series of AV clips from the base AV file, which remain unchanged. The macro synchronized table of AV clips continues with the key value pairs representing each AV clip in the series of AV clips from the sliding AV file. As shown, the original timestamp of each of the AV clips in the series of AV clips from the sliding AV file has been modified by the BFOS*. For example, as depicted in FIG. 16B, the macro synchronized timestamp of clip (B)(AV1) is now the original timestamp of (B)(AV1) (i.e., time t=$t_0$(B)(AV1)) plus the BFOS* (which may be a negative or positive value).

Figures 17A, 17B:
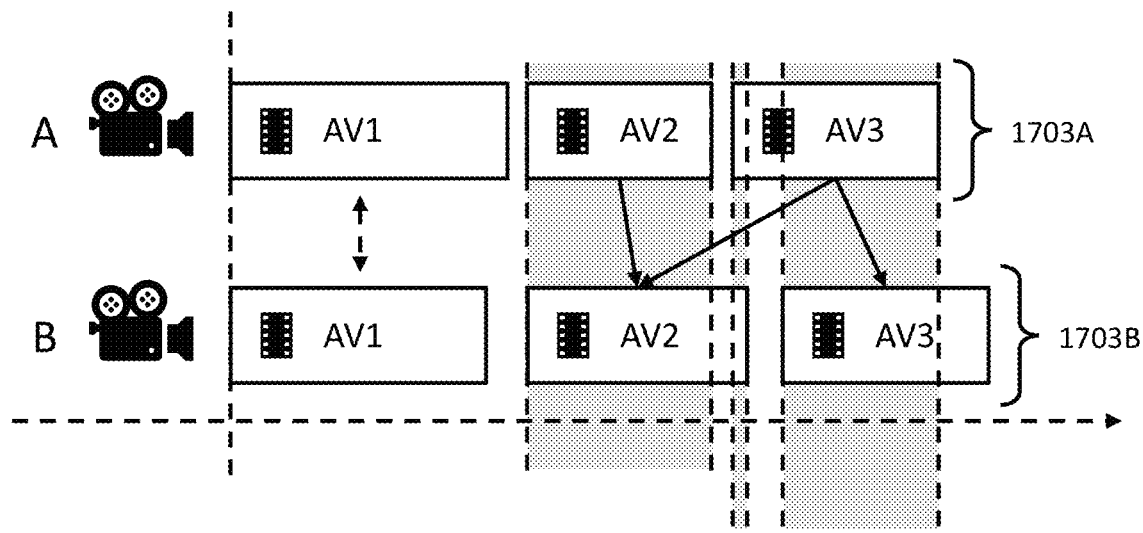
FIG. 17A depicts a micro synchronization process.
FIG. 17B depicts a micro synchronized table of audio-visual clips.

As mentioned above, in some embodiments, the system 1100 synchronizes a set of parallel AV files using a two-step process, macro synchronization and micro synchronization. In such an embodiment, after generating a macro synchronized table of AV clips using a macro synchronization process (as described above), the system 1100 finishes synchronizing the set of parallel AV clips using a lattice confidence scoring (LCS) process. FIGS. 17A and 17B depict the LCS process. In the LCS process, the system 1100 begins by adding a tolerance threshold to the BFOS* (e.g., +/−2 seconds). Then, in some embodiments, the system 1100 selects the first unmatched AV clip from the base AV file (i.e., the first AV clip in the series of AV clips from the base AV file that was not considered during the macro synchronization process; for example, if the series of AV clips from the base AV file includes five AV clips and the macro synchronization process short circuits after performing a test involving on the second AV clip in the series of AV clips from the base AV file and before performing a test involving the third AV clip in the series, then the third AV clip in the series of would be the first unmatched AV clip from the base AV file) and performs the waveform maximization function (in the range defined by the tolerance threshold) between the first unmatched AV clip from the base AV file and each of the AV clips from the sliding AV file that overlaps (i.e., any AV clip from the sliding AV file that has a runtime, as defined by its timestamp and duration, that overlaps with the runtime of the first unmatched AV clip from the base AV file) producing a new $BFOS_{clip}$ for each of those AV clips from the sliding AV file. The system 1100 then compares the $BFOS_{clip}$ calculated for each of the AV clips from the sliding AV file to the BFOS* produced by the macro synchronization process by taking the absolute value of the difference of the $BFOS_{clip}$ and the BFOS*. If the absolute value of the difference for a particular clip is greater than a predefined threshold (e.g., 2 seconds), the $BFOS_{clip}$ is tossed out. If the absolute value of the difference for a particular clip is less than the predefined threshold, the $BFOS_{clip}$ is stored as an adjustment for the particular clip in a micro adjustment table, as depicted in FIG. 17B. The system then repeats this process for each of the remaining unmatched clips from the base AV file to complete the micro adjustment table. In some embodiments, the system 1100 begins the LCS process with the longest unmatched AV clip from the base AV file. In some embodiments, during the micro synchronization process, the waveform maximization function is only performed on the overlapping section of a pair of clips from the parallel AV files.

For example, in the example depicted by FIG. 17A, the system 1100 has employed the Cascade synchronization process for macro synchronization, and the Cascade process was short circuited after performing a test involving clips (A)(AV1) (the base AV file 1703A) and (B)(AV1) (the sliding AV file 1703B). The second AV clip in the series of AV clips from the base AV file (i.e., clip (A)(AV2)) is therefore the first unmatched AV clip from the base AV file 1703A. The system 1100 then identifies which (if any) of the clips from the sliding AV file 1703B overlap with the first unmatched AV clip from the base AV file 1703A, (A)(AV2), and performs the waveform maximization function between (A)(AV2) and those overlapping clips from the sliding AV file 1703B. In this example, as depicted in FIG. 17A, only clip (B)(AV2) overlaps with (A)(AV2), so the system 1100 only performs the waveform maximization function between clips (A)(AV2) and (B)(AV2). In this example, the absolute value of the difference between the $BFOS_{clip}$ produced for (B)(AV2) and the BFOS* produced by the macro synchronization process is less than one second, so the difference between $BFOS_{clip}$ and the BFOS* (not the absolute value) is stored as an adjustment for clip (B)(AV2) determined by its comparison with clip (A)(AV2), ADJ(2,2).

In this example, the system 1100 then moves to the next unmatched AV clip from the base AV file 1703A (in this case, clip (A)(AV3)), identifies which (if any) of the clips from the sliding AV file 1703B overlap with clip (A)(AV3) (in this case, both clips (B)(AV2) and (B)(AV3)), and separately performs the waveform maximization function between (i) (A)(AV3) and (B)(AV2) and (ii) (A)(AV3) and (B)(AV3).

The absolute value of the difference between the BFOS* and the values produced for (i) and (ii) are both less than 2 seconds, so the difference between the BFOS* and the values produced for (i) and (ii) are stored as adjustments for clips (B)(AV2) and (B)(AV3) determined by their comparisons with clip (A)(AV3), ADJ(3,2) and ADJ(3,3), respectively. Having now completed this process for all of the unmatched clips from the base AV file 1703A, all of the adjustments (e.g., adjustments ADJ(2,2), ADJ(3,2), and ADJ(3,3)) are stored within the micro adjustment table 1712, as depicted in FIG. 17B.

Once the system 1100 completes the micro adjustment table 1712 by performing the wave maximization function between the unmatched AV clips from the base AV file and any overlapping AV clips from the sliding AV file, the system 1100 then modifies the macro synchronized table of AV clips (i.e., CT1, as depicted in FIG. 16B) using the micro adjustment table 1712 to create a micro synchronized table of AV clips (also referred to as a "second correction table" or "CT2"). Like the macro synchronized table of AV clips (CT1), the micro synchronized table of AV clips (CT2) is a table of key value pairs, wherein each key is an identifier of a particular AV clip and each value is a timestamp. Here, just as in the macro synchronized table of AV clips, the timestamps of the AV clips from the base AV file remain unchanged. The timestamps of the AV clips from the sliding AV file, however, which had been modified by the BFOS* in CT1, are now further modified by the adjustments stored in the micro adjustment table 1712. For example, as depicted in FIG. 17B, the timestamp of clip (B)(AV3) is now time $t=t_0(B)(AV3)+BFOS^*+ADJ(3,3)$. The micro synchronized table of AV clips—the best possible alignment of clips between the base AV file and the sliding AV file—is the final output of the micro synchronization process.

In some embodiments, only one adjustment may be used for a particular AV clip from the sliding AV file. For example, as depicted in FIGS. 17A and 17B, two adjustments for AV clip (B)(AV2) have been calculated and stored within the adjustment table 1712 (i.e., ADJ(2,2) and ADJ(3,2)), but only one adjustment has been applied to clip (B)(AV3) in the micro synchronized table of AV clips (i.e., ADJ(3,3)). The system 1100 may use different methods to determine which adjustment should be applied to a clip from the sliding AV file when more than one adjustment for the clip has been calculated. In some embodiments, as in the example depicted in FIGS. 17A and 17B, the system 1100 selects the adjustment was produced from the pair of AV clips from the parallel AV files that had the longest overlap. In this example, the overlap between clips (A)(AV2) and (B)(AV2) is longer than the overlap between clips (A)(AV3) and (B)(AV2), and therefore ADJ(2,2) (produced from the comparison between (A)(AV2) and (B)(AV2)) is selected preferentially over ADJ(3,2) (produced from the comparison between (A)(AV3) and (B)(AV2)).

The synchronization process (e.g., macro synchronization and micro synchronization) can be recursively repeated for as many parallel AV files are included in the plurality of parallel AV files received by the system 1100, and the synchronization generally becomes more accurate with the inclusion of additional parallel AV files. For example, if the plurality of parallel AV files received by the system 1100 includes a third parallel AV file (e.g., AV file 1203C, recorded on video source 1202C), the macro and micro synchronization processes that were performed between AV file 1203A as the base AV file and AV file 1203B as the sliding AV file can additionally be performed between AV file 1203C as the base AV file and AV file 1203B as the sliding file. The inclusion here of an additional reference point to compare AV file 1203B against further ensure that the modifications of the timestamps of the clips from AV file 1203B are as accurate as possible. Once the synchronization process has been executed for all of the parallel AV files included in the plurality of parallel AV files received by the system 1100, thereby producing a complete micro synchronized table of AV clips, the synchronization of the plurality of parallel AV files is complete.

Characterization of a Vector Matrix

As mentioned above, in some embodiments, after the system 1100 receives a plurality of parallel AV files and synchronizes the plurality of parallel AV files (as described above), the system 1100 then generates a set of vector cubes including a unique vector cube for each clip included in the plurality of parallel AV files (as described above). Once a vector cube has been generated for an AV clip, the system 1100 can then use the vector cube to characterize the action recorded on the AV clip. FIG. 18A depicts a process for characterizing a segment of an AV clip. In some embodiments, to characterize the action recorded on an AV clip, the system 1100 uses a vector cube generated for the AV clip to calculate a character score for each segment of the AV clip. In some embodiments, calculating a character score for a segment of an AV clip begins with determining the character of the action or motion recorded on the AV clip (also referred to as "motion character"). For example, in some embodiments, the character of the action recorded on an AV clip may be convergent or divergent. In some embodiments, the system 1100 autonomously determines the character of the action recorded on the AV clip, such as by using one or more computer vision techniques. In some embodiments, the system 1100 requires a user to manually submit the character of the action recorded on the AV clip. Once the character (e.g., convergent, divergent, etc.) of the action recorded on the AV clip has been determined, the system 1100 then calculates a character score (e.g., a convergence score or a divergence score) of the segment of the AV clip according to that character.

For example, FIG. 18A depicts the calculation of a convergence score for the first segment (i.e., the motion occurring between times $t_0=0$ s and $t_1=1$ s) of the AV clip discussed above with respect to FIG. 6A (equivalent to the AV clip of the running man recorded by Cam A, as illustrated in FIG. 10). In some embodiments, the system 1100 breaks the motion vector in each grid box into its component parts (i.e., the horizontal component of the vector and the vertical component of the vector; hereinafter, "vector components"). In this example, each non-zero vector in the vector matrix 624 has a horizontal component of +3 pixels (i.e., 3 pixels to the right) and a vertical component of 0 pixels. Then, in some embodiments, as depicted in FIG. 18A, the system 1100 factors the vector components of each grid box according to their alignment with the determined character (e.g., convergent) of the action recorded on the AV clip. For example, in the example depicted by FIG. 18A, a positive horizontal component of a motion vector in a cell is multiplied by the difference between the size of the grid box in the horizontal direction (in this example, 10) and the cell's horizontal position on the grid (i.e., gx). A negative horizontal component of the motion vector in a cell is simply multiplied by the cell's gx. This can be interpreted as weighing convergent motion (i.e., motion in the direction of the center of the grid box) further away from the center of the grid box more positively than convergent motion closer to the center of the grid box, while divergent motion (i.e., motion in the direction away from the center of the grid box) is weighed negatively. For example, in the example depicted by FIG. 18A, although the absolute value of the horizontal convergent motion is the same in cell [0,8] as it is in cell [3,3], the factored value of the horizontal convergent motion in cell [0,8] ($t_{vx}(0,8)=+3*(10-0)=30$)) is greater than that of cell [3,8] ($t_{vx}(3,8)=+3*(10-3)=21$)). In this example, the system 1100 then creates a temporary score ($t_s$) for each individual cell by squaring the factored values of the horizontal and vertical components of the motion vector in the individual cell ($t_{vx}$ and $t_{vy}$, respectively), summing those values, and then taking the square root.

In some embodiments, after a temporary score $t_s$ has been calculated for each cell, the $t_s$ scores are summed to calculate the total amount of motion aligned with the determined character of the action recorded on the AV clip (hereinafter, "direction motion" or "character motion"). For example, in the example depicted by FIG. 18A, in which a convergence score is being calculated for the segment depicted in FIG. 6, the direction motion (in this example, convergent motion) is calculated as the square root of the summed squares of the horizontal and vertical components of the motion vectors in each cell, as depicted in FIG. 18A. In this example, as depicted by FIG. 18A, the convergent motion is 399. Then, in some embodiments, an absolute amount of motion (hereinafter, "absolute motion") is determined for the clip, is calculated as the sum of the $t_s$ scores, which, in this example, is also 399. In some embodiments, the final character (e.g., convergence) score can then be calculated as the direction motion divided by the absolute motion. In this example, the convergence score is equal to 1, an indication that all of the motion occurring in the segment is convergent. If, for example, the motion in the segment had included a ball moving three pixels to the left ($\Delta x=-3$ pixels) in grid box [2,1], as depicted in FIG. 18B, the convergent motion would be equal to 393, the absolute motion would be equal to 405, and the convergence score would be equal to 0.97—an indication that most, but not all, of the motion occurring in the segment is convergent (i.e., moving toward the center of the grid box).

In some embodiments, the system 1100 characterizes the action recorded on every AV file included in the plurality of AV files by calculating a character score (as described above) for each segment of every AV clip included in the plurality of parallel AV files. For example, in some embodiments, the system 1100 will use the vector cube generated for each clip included in the plurality of AV files and calculate a character score (e.g., based on the determined character of the action recorded on the clip) for each of the vector matrices included in the vector cube. In some embodiments, the system 1100 can then use the characterized segments to select and optimize AV clips from the plurality of AV files, as described below. In some embodiments, before characterizing a vector cube (e.g., by calculating a character score for each vector matrix included in the vector cube, as described above), the system 1100 can apply one or more vector cube filters to the vector cube, as described above.

Selecting and Optimizing Segments of AV Clips

In some embodiments, after receiving a plurality of parallel AV files, synchronizing the series of AV clips included in the plurality of parallel AV files, generating a set of vector cubes for the AV clips, and characterizing the segments of the vector cubes (e.g., the vector matrices) in the set of vector cubes, the system 1100 then selects and optimizes segments of the AV clips that will ultimately be compiled into a final, new video file (also referred to as an "optimized AV file").

In some embodiments, the system 1100 begins selecting and optimizing segments of AV clips by using the characterized vector cubes to identify local and global breakpoints within the AV clips. FIG. 19 depicts a process for identifying local breakpoints within an AV clip. FIG. 19 depicts an exemplary section 1908 of the AV clip (A)(AV1) that spans eight one-second segments (i.e., $\Delta t_{11}$ to $\Delta t_{18}$) from times t=$t_{10}$(A)(AV1) to t=$t_{19}$(A)(AV1). The character score (e.g., convergence score) for each segment is shown in the boxes within the exemplary section of (A)(AV1). For example, the character score 1927A for segment $\Delta t_{17}$ is 0.78. In some embodiments, the system 1100 identifies a breakpoint within an AV clip by taking the maximum character score ($CS_{max}$) within the clip or an average of the character scores within the clip ($CS_{avg}$) and identifying which of the segments within the clip have a character score less than a predetermined or user defined percentage of the maximum character score or average of the character scores. For example, in the example depicted in FIG. 19, if the $CS_{avg}$ is 0.65 and the user defined percentage is 50%, then both $\Delta t_{14}$ (with a character score 1927B of 0.24) and $\Delta t_{15}$ (with a character score 1927C of 0.27) fall under the user defined percentage of the $CS_{avg}$. The system 1100 therefore identifies the section of clip (A)(AV1) defined by the span of those two segments as a breakpoint 1942 (i.e., a local breakpoint) in clip (A)(AV1).

In some embodiments, after identifying a breakpoint in an AV clip, the system 1100 can then split the AV clip into two new AV clips at the breakpoint and update the synchronized table of AV clips accordingly. For example, in the example depicted in FIG. 19, the system 1100 can split clip (A)(AV1) into two new clips at the breakpoint 1942 identified in the section of (A)(AV1) defined by segments $\Delta t_{14}$ and $\Delta t_{15}$ (e.g., by discarding segments $\Delta t_{14}$ and $\Delta t_{15}$ entirely). In this example, the two new clips will now be (i) a first (A)(AV1) clip beginning at the initial timestamp of the original (A)(AV1) clip and ending after $\Delta t_{13}$ and (ii) a second (A)(AV1) clip beginning after $\Delta t_{15}$ and ending at the end of the original (A)(AV1) clip. As depicted in FIG. 19, in this example, the original synchronized table of AV clips (CT2) is now modified such that the original entry for clip (A)(AV1) has been replaced with two new entries for the new first (A)(AV1) clip and second (A)(AV1), producing an updated synchronized table of AV clips 1944. In some embodiments, as depicted in this example, the new entries include two new values, a lead (l) and a duration (d). The lead indicates the amount of time from the beginning of the original (A)(AV1) clip that a new clip should begin at (e.g., in the example depicted by FIG. 19, the lead $l_1$ for the first (A)(AV1) clip would be zero, and the lead $l_2$ for the second (A)(AV1) clip would be 15 seconds). The duration $d_1$ indicates how long a new clip should last (e.g., in the example depicted by FIG. 19, the duration $d_2$ for the first (A)(AV1) clip would be 13 seconds, and the duration of the second (A)(AV1) clip would be the difference of 13 seconds and the duration of the original (A)(AV1) clip).

In some embodiments, the system 1100 continues identifying local breakpoints within a clip and creating two new clips from the breakpoint until there are no more breakpoints found within the clip. The system 1100 can then repeat this process for each clip included in the plurality of parallel AV files until all of the local breakpoints in all of the clips have been identified and the updated synchronized table of AV clips 1944 has been completely updated to include all of the new clips created from the local breakpoints. In some embodiments, after creating the updated synchronized table of AV clips 1944, the system 1100 can then use the updated synchronized table of AV clips 1944 to identify global breakpoints within the plurality of parallel AV files, as described below.

Figure 20:
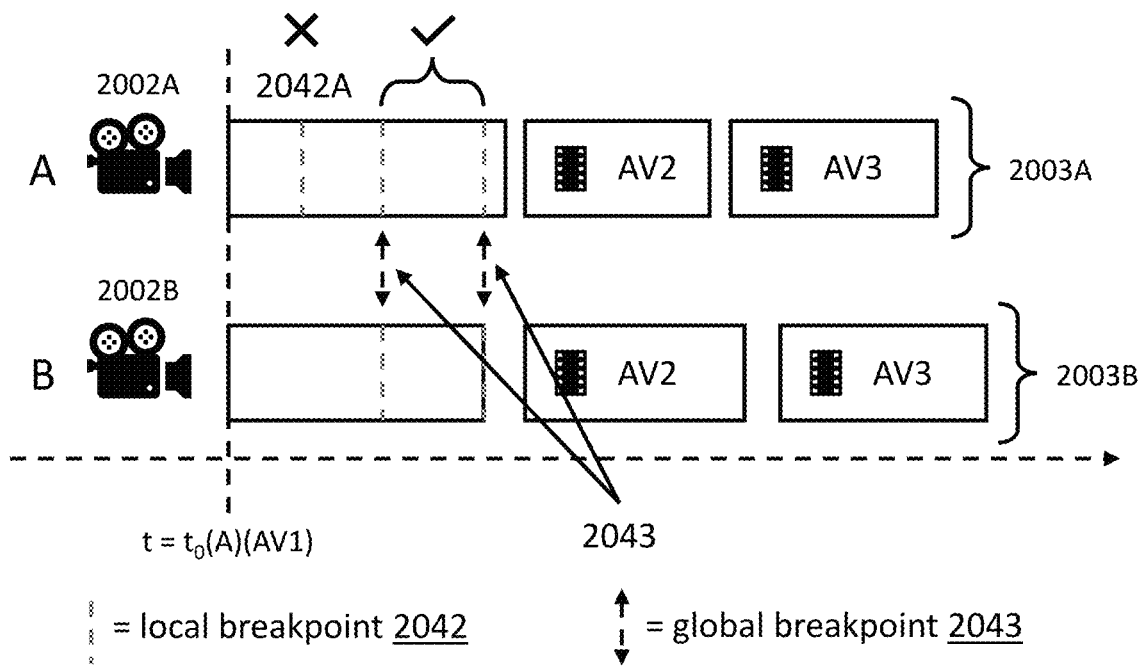
FIG. 20 depicts a process for identifying global breakpoints.

FIG. 20 depicts a process for identifying global breakpoints within a plurality of parallel AV clips. FIG. 20 depicts two exemplary parallel AV files (e.g., a plurality of parallel AV files received by the system 1100, AV file 2003A and parallel AV file 2003B, recorded on video sources 2002A and 2002B, respectively. The parallel AV files 2003 have been synchronized (as described above), a set of vector cubes has been generated for the parallel AV files 2003 (as described above), each vector cube within the set of vector cubes has been characterized (as described above), and all of the local breakpoints have been identified in each of the AV clips included in the parallel AV files. As shown in FIG. 20, three local breakpoints 2042 have been identified in the first clip in the series of AV clips from AV file 2003A. In some embodiments, the system 1100 determines if the local breakpoints 2042 identified in AV file 2003A align with local breakpoints in all of the other parallel AV files (e.g., parallel AV file 2003B. In this example, as depicted in FIG. 20, the first local breakpoint 2042A identified for AV file 2003A does not align with a local breakpoint in an AV clip from parallel AV file 2003B. However, both the second and third local breakpoints identified for AV file 2003A do align with local breakpoints in AV file 2003B. The system 1100 can then identify the times at which the second and third local breakpoints identified for AV file 2003A occur as global breakpoints 2043 for the plurality of parallel AV files. In some embodiments, global breakpoints 2043 can then be used to mark optimal times for the system 1100 to transition from one parallel AV file to another parallel AV file when selecting sections of individual parallel AV files to be included in a final, new video file, as described below.

Figure 21:
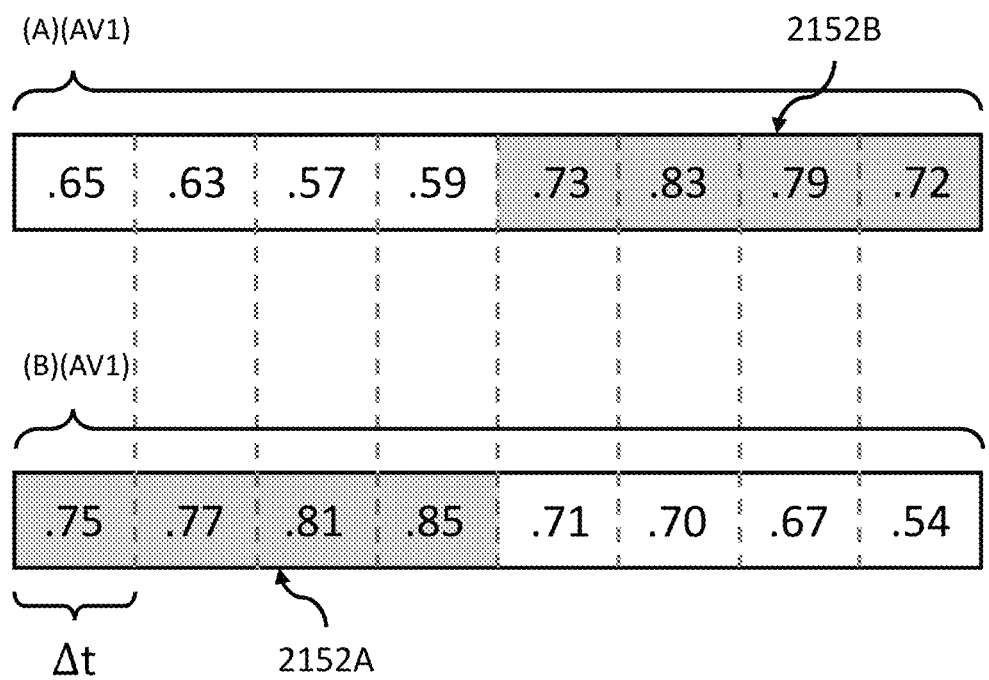
FIG. 21 depicts a process for selecting sections between a plurality of audio-visual clips.

In some embodiments, before the system 1100 transforms a plurality of parallel AV files into a final, new video file, the system 1100 selects sections of the individual parallel AV files to be included in the final, new video file (also referred to as an "optimized AV file"). FIG. 21 depicts a process for selecting sections of individual parallel AV files 1403 to be included a final, new video file. In some embodiments, the system 1100 selects sections 2152 of individual parallel AV files by selecting the segments ($\Delta t$) with the highest character scores. In the example illustrated in FIG. 21, a span of eight segments of an AV clip from a first parallel AV file (e.g., (A)(AV1)) is shown above a corresponding span of eight segments of an AV clip from a second parallel AV file (e.g., (B)(AV1)). A character score calculated for each segment is shown within a box representing each individual segment. In this example, the character scores of the first four segments ($\Delta t$) of clip (A)(AV1) are higher than those of the first four segments of the clip (B)(AV1), so the system can preferentially select the section 2152A defined by those four segments of the clip (B)(AV1) over the corresponding segments of the clip (A)(AV1) to be included in the final, new video file. However, in this example, the character scores of the last four segments of (A)(AV1) are higher than those of the last four segments of (B)(AV1), so the system 1100 can preferentially select the section 2152B defined by those four segments (A)(AV1) over the corresponding segments of (B)(AV1). In some embodiments, the system 1100 selects sections 2152 of individual parallel AV files by taking a rolling average of the character scores and then selecting the sections with the highest average character score. For example, in the example depicted by FIG. 21, the first four segments of (A)(AV1) have an average character score of 0.61, while the first four segments of (B)(AV1) have an average character score of 0.795. The system 1100 can then preferentially select the section 2152A defined by those first four segments of (B)(AV1) over the corresponding segments of (A)(AV1). In some embodiments, the system selects sections 2152 no shorter than a predetermined or user defined length of time (e.g., 1, 2, or 3 seconds) or number of segments (e.g., 1, 2, or 3 segments). However, the system 1100 may select segments from parallel AV files in any other way. In some embodiments, after selecting a section of an AV clip to be included in the final video file, the system 1100 creates a new table of synchronized AV clips (hereinafter, a "final table of AV clips") and adds an entry to the final table of AV clips for the selected section of the AV clip. In some embodiments, the entry for the selected section of the AV clip includes a clip name, the timestamp of the clip, a lead (as described above) for the selected section, and a duration for the selected section (as described above). Ultimately, the system 1100 will fully populate the final table of AV clips with entries for each of the sections selected from the plurality of parallel AV files for the final video.

In some embodiments, the system 1100 can flag an unlikely transition from a first selection of segments from a first parallel AV file 2003 (e.g., AV file 2003A) and to a second selection of segments a second parallel AV file (e.g., AV file 2003B) (hereinafter, an "unlikely sequence"). In some embodiments, the system 1100 flags unlikely sequences using machine learning techniques. For example, the system 1100 receives a plurality of parallel AV files that includes three separate parallel AV files (e.g., AV file A, AV file B, and AV file C), synchronizes and characterizes the clips included in the three parallel AV files (as described above), and begins selecting sections 2152 between the three parallel AV files. In the process, a pattern emerges: the selection of sections begins with a section from AV file A, followed by a section from AV file C, followed by a section from AV file B. This pattern repeats ten times, training a machine learning algorithm. Then, a sequence emerges that begins with a section from AV file B, followed by a section from AV file C, followed by another section AV file B. In this example, the machine learning algorithm can flag this sequence as an unlikely sequence and the system 200 can exclude the sequence from being selected for the final video file.

Figure 22:
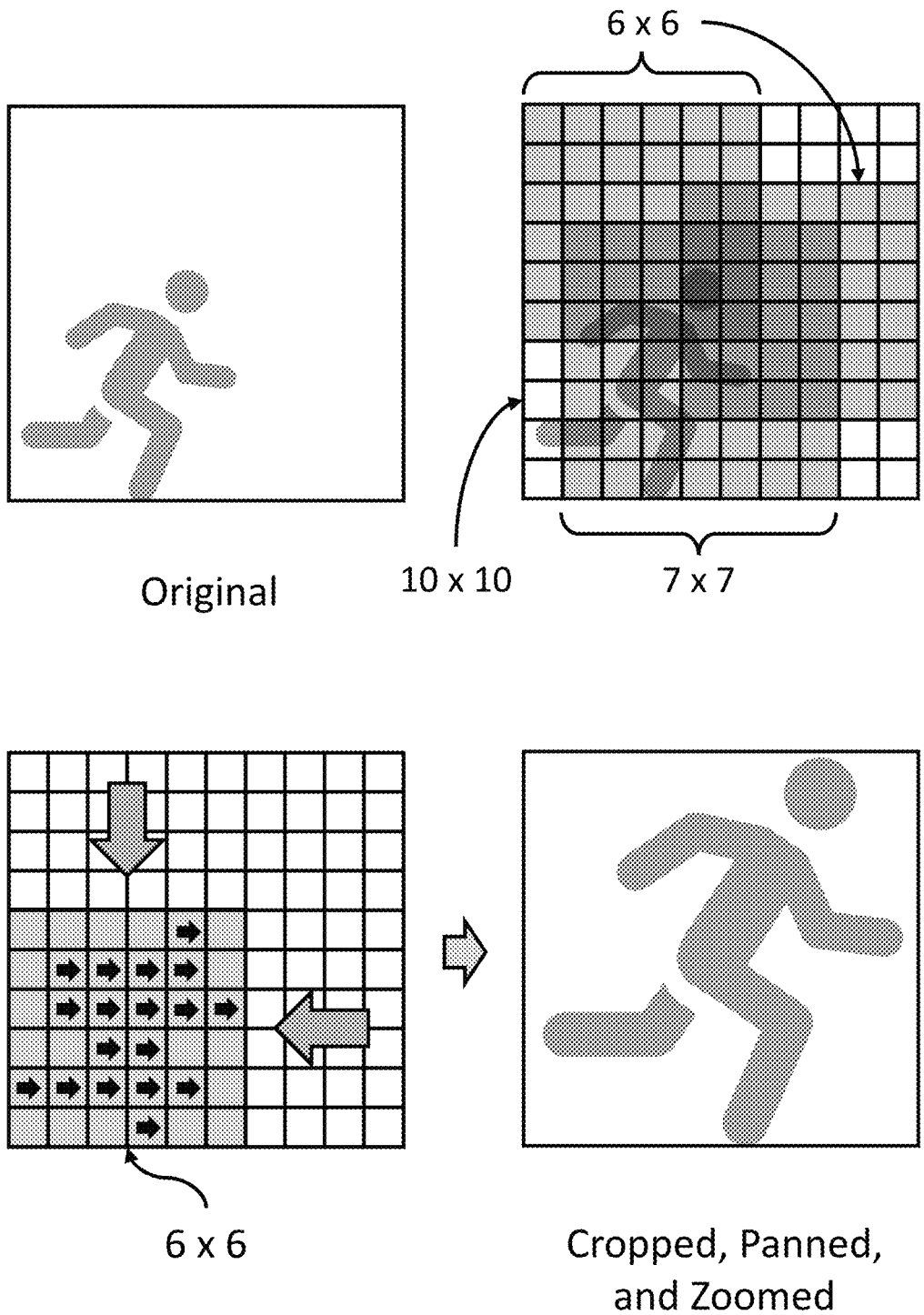
FIG. 22 illustrates a process for cropping, panning, or zooming within a video.

In some embodiments, after selecting a section of segments of an AV clip to be included in the final video file, the system 1100 crops, pans, or zooms the section to optimize the quality of the final video. FIG. 22 depicts an exemplary process for cropping, panning, or zooming a section of an AV clip. In some embodiments, the system 1100 uses a vector cube (as described above) of an AV clip to crop, pan, or zoom a section of the AV clip. In some embodiments, for example, as depicted by FIG. 22, the system 1100 retrieves the vector matrix of a segment within the section of the AV clip and determines the aspect ratio of the grid box of the vector matrix (in this example, 10×10) and identifies every possible area with the same integer aspect ratio of the grid box within the grid box. For example, FIG. 22 depicts 2 exemplary possible 6×6 areas within the 10×10 grid box and one possible 7×7 area within the 10×10 grid box. All three of the shaded areas have the same integer aspect ratio of the grid box. In some embodiments, the system 1100 only identifies possible areas greater than a predetermined or user defined scale of the area of the grid box (e.g., in this example, larger than or equal to 5×5). In some embodiments, after identifying all such possible areas, the system 1100 then calculates a character score (as described above) for each of the possible areas and crop, pan, zooms the segment to the smallest possible area with the highest character score. For example, in the example depicted by FIG. 22, system 1100 identifies the 6×6 area in the bottom left corner of the grid box as the smallest possible area with the highest character score. Or, for example, in some embodiments, the system 1100 selects the possible area that maximizes the equation y=(motion inside the possible area−motion outside of the possible area)/(total motion within the frame). However, the system 1100 can use any logic to crop, pan, zoom a segment of a section of an AV clip. In some embodiments, the system 1100 can stabilize the cropping, panning, and zooming of a section of an AV clip by only cropping, panning, and zooming between segments if the difference between the sizes of the areas to be cropped, panned, and zoomed between is larger than a predetermined or user defined difference.

Compiling and Rendering a New Video File

Finally, in some embodiments, once the system 1100 has finished processing a plurality of parallel AV files, to synchronize, characterize, select, or optimize the AV clips included in the plurality of parallel AV files, the system 1100 compiles the plurality of parallel AV files into a new, final video file. For example, in some embodiments, the system 1100 synchronizes the series of AV clips included in the plurality of parallel AV files, generates a set of vector cubes including a vector cube for each of the AV clips, characterizes each segment of each vector cube (e.g., each vector matrix included in the vector cubes), and selects the best sections of the AV clips from the plurality of parallel AV files according to predetermined or user defined criteria and thresholds, ultimately producing a final table of AV clips (as described above). Then, in some embodiments, the system 1100 retrieves the actual sections of the video clips (e.g., the raw footage) according to the final table of AV clips, crops, pans, and zooms the sections of the video clips to optimize those sections, and then compiles those optimized sections into a single, new, and final video file that can be exported and played on any device. For example, in some embodiments, the system 1100 exports the final video file in any standard video format, such as MP4, AVI, or QuickTime (MOV). In some embodiments, the final video file is compiled by the system 1100 and rendered by an external system. In some embodiments, the final video file is compiled and rendered by the system 1100 (e.g., by the compile module 1170).

As a person skilled in the art will recognize from the previous detailed description and from the figures and claims, modifications and changes can be made to the embodiments of the invention without departing from the scope of this invention as disclosed here in the present application. It will be appreciated that, although the methods, processes, and functions of the present application have been recited in a particular series of steps, the individual steps of the methods, processes, and functions may be performed in any order, in any combination, or individually.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The aforementioned computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks. The computer program instructions may also be loaded onto a computer or other programmable data processing apparatus to cause a series of operational steps to be performed on the computer or other programmable apparatus, to produce a computer implemented process such that, the instructions which execute on the computer or other programmable apparatus provide steps for implementing the functions/acts specified in the block or blocks.

In general, the word "module" as used herein, refers to logic embodied in hardware or firmware, or to a collection of software instructions, written in a programming language, such as, Java, C, etc. One or more software instructions in the unit may be embedded in firmware. The modules described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, and hard disk drives.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, an "audio-visual file" or "AV file" is a series of one or more audio-visual (AV) clips recorded on the same video source (e.g., a single video camera). Two or more "parallel AV files" are recordings of the same action recorded on two or more respective video sources.

As used herein, a "waveform" is an audio waveform extracted from an audio-visual (AV) file. A "waveform maximization function" is computational process wherein two waveforms are compared to determine a translation value (e.g., a number of seconds) that best synchronizes the two waveforms. For example, in some embodiments, a waveform maximization function translates a first waveform against a second waveform to find a translation value that minimizes the difference between the root mean square (RMS) of the first waveform and the RMS of the second waveform (referred to herein as a "ΔRMS") The translation value that best synchronizes the two waveforms is referred to herein as a "best fit offset" or "BFOS."

As used herein, a "vector cube" is a compilation of one or more vector matrices created for a single AV clip. In some embodiments, a "vector matrix" is created for an AV clip by capturing a first still image at a first time during the AV clip and a second still image at a second, later time during the AV clip, identifying objects that exist in both the first still image and the second still image, and calculating vectors representing the movement of those objects from the first still image to the second still image. In some embodiments, the difference in time between a first still image and a second still image is referred to herein as an "segment." In some embodiments, to generate a vector cube for an AV clip, a vector matrix is created for every segment of the AV clip. For example, if an AV clip is 5 seconds long and a segment is 1 second, five vector matrices can be created for the AV clip and compiled into a vector cube generated for the 5 second AV clip.

As used herein, a "character score" is a quantification of the motion represented by the vectors of a vector matrix according to a particular type of action. For example, in some embodiments, the type of action may be convergent (i.e., toward the center of the frame of the vector matrix) or divergent (i.e., away from the center of the frame of the vector matrix). In such an embodiment, a character score may be a "convergent score" or a "divergent score," respectively. For example, in some embodiments, a convergent score of a vector matrix is calculated as the amount of motion occurring within the vector matrix toward the center of the frame of vector matrix divided by the total amount of motion occurring within the vector matrix.

What is claimed is:

1. A computer-implemented method for processing a video file, the method comprising:
identifying a plurality of still images from an original video file;
identifying, based on a geometric framework applicable to respective ones of the plurality of still images, two or more first areas within a first still image of the plurality of still images;
identifying, based on the geometric framework, two or more second areas within a second still image of the plurality of still images, wherein the two or more second areas correspond to the two or more first areas;
identifying, based on the geometric framework, two or more third areas within a third still image of the plurality of still images, wherein the two or more third areas correspond to the two or more second areas;
determining, for each one of the two or more first areas relative to each corresponding one of the two or more second areas, a first value associated with a difference between the first still image and the second still image;
determining, for each one of the two or more second areas relative to each corresponding one of the two or more third areas, a second value associated with a difference between the second still image and the third still image;
determining, based on the first values, a first preferred subframe for a first segment associated with the first still image and the second still image;
determining, based on the second values, a second preferred subframe for a second segment associated with the second still image and the third still image;
modifying, based on the first preferred subframe, the first still image through one or more of (i) a cropping process, (ii) a zooming process, or (iii) a panning process to create a modified first still image;
modifying, based on the second preferred subframe, the second still image through one or more of (i) a cropping process, (ii) a zooming process, or (iii) a panning process to create a modified second still image; and
compiling the modified first still image and the modified second still image into a new video file.

2. The method of claim 1, wherein the original video file also includes audio.

3. The method of claim 1, wherein respective ones of the plurality of still images from the original video file are separated by the same time interval within a time period of the original video file.

4. The method of claim 1, wherein the first values associated with the differences between the first still image and the second still image are determined based on motion vectors.

5. The method of claim 1, wherein the first values associated with the differences between the first still image and the second still image are determined based on pixel deltas.

6. The method of claim 1, wherein the first values associated with the differences between the first still image and the second still image are determined based on pixel RGB values.

7. The method of claim 1, wherein the first values associated with the differences between the first still image and the second still image are determined using computer vision techniques.

8. The method of claim 1, wherein each of the two or more first areas corresponds to a location of an object in the first still image.

9. The method of claim 1, wherein the first preferred subframe has a size that is equal to or larger than a predetermined minimum subframe size.

10. The method of claim 1, wherein the first preferred subframe has a size that is proportional to a size of the geometric framework.

11. A system configured to process a video file, the system comprising:
  memory including machine-readable instructions; and
  one or more processors configured, in response to executing the machine-readable instructions, to perform operations comprising:
    identifying a plurality of still images from an original video file;
    identifying, based on a geometric framework applicable to respective ones of the plurality of still images, two or more first areas within a first still image of the plurality of still images;
    identifying, based on the geometric framework, two or more second areas within a second still image of the plurality of still images, wherein the two or more second areas correspond to the two or more first areas;
    identifying, based on the geometric framework, two or more third areas within a third still image of the plurality of still images, wherein the two or more third areas correspond to the two or more second areas;
    determining, for each one of the two or more first areas relative to each corresponding one of the two or more second areas, a first value associated with a difference between the first still image and the second still image;
    determining, for each one of the two or more second areas relative to each corresponding one of the two or more third areas, a second value associated with a difference between the second still image and the third still image;
    determining, based on the first values, a first preferred subframe for a first segment associated with the first still image and the second still image;
    determining, based on the second values, a second preferred subframe for a second segment associated with the second still image and the third still image;
    modifying, based on the first preferred subframe, the first still image through one or more of (i) a cropping process, (ii) a zooming process, or (iii) a panning process to create a modified first still image;
    modifying, based on the second preferred subframe, the second still image through one or more of (i) a cropping process, (ii) a zooming process, or (iii) a panning process to create a modified second still image; and
    compiling the modified first still image and the modified second still image into a new video file.

12. The system of claim 11, wherein the original video file also includes audio.

13. The system of claim 11, wherein respective ones of the plurality of still images from the original video file are separated by the same time interval within a time period of the original video file.

14. The system of claim 11, wherein the first values associated with the differences between the first still image and the second still image are determined based on motion vectors.

15. The system of claim 11, wherein the first values associated with the differences between the first still image and the second still image are determined based on pixel deltas.

16. The system of claim 11, wherein the first values associated with the differences between the first still image and the second still image are determined based on pixel RGB values.

17. The system of claim 11, wherein the first values associated with the differences between the first still image and the second still image are determined using computer vision techniques.

18. The system of claim 11, wherein each of the two or more first areas corresponds to a location of an object in the first still image.

19. The system of claim 11, wherein the first preferred subframe has a size that is equal to or larger than a predetermined minimum subframe size.

20. The system of claim 11, wherein the first preferred subframe has a size that is proportional to a size of the geometric framework.

* * * * *